US012701551B2

(12) United States Patent
Wang et al.

(10) Patent No.: US 12,701,551 B2
(45) Date of Patent: Aug. 4, 2026

(54) ELECTRONIC DEVICE, WIRELESS COMMUNICATION METHOD, AND COMPUTER-READABLE STORAGE MEDIUM

(71) Applicant: Sony Group Corporation, Tokyo (JP)

(72) Inventors: Xiaoxue Wang, Beijing (CN); Chen Sun, Beijing (CN)

(73) Assignee: Sony Group Corporation, Tokyo (JP)

( * ) Notice: Subject to any disclaimer, the term of this patent is extended or adjusted under 35 U.S.C. 154(b) by 286 days.

(21) Appl. No.: 18/563,924

(22) PCT Filed: May 25, 2022

(86) PCT No.: PCT/CN2022/094955
§ 371 (c)(1),
(2) Date: Nov. 24, 2023

(87) PCT Pub. No.: WO2022/253070
PCT Pub. Date: Dec. 8, 2022

(65) Prior Publication Data
US 2024/0244589 A1      Jul. 18, 2024

(30) Foreign Application Priority Data

Jun. 1, 2021    (CN) .......................... 202110608887.2

(51) Int. Cl.
*H04W 72/02*          (2009.01)
*H04W 72/0453*        (2023.01)
          (Continued)

(52) U.S. Cl.
CPC ....... *H04W 72/02* (2013.01); *H04W 72/0453* (2013.01); *H04W 72/20* (2023.01); *H04W 72/40* (2023.01)

(58) Field of Classification Search
CPC .. H04W 72/02; H04W 72/20; H04W 72/0453
See application file for complete search history.

(56) References Cited

U.S. PATENT DOCUMENTS 1,671,965 A  *  6/1928  Brown .................... H01H 17/00
                                                  200/543
11,711,677 B2 *  7/2023  Hwang ................. H04L 1/1854
                                                  370/329
                  (Continued)

FOREIGN PATENT DOCUMENTS

CN          111526587 A        8/2020
WO      2021/028531 A1      2/2021

OTHER PUBLICATIONS

Intel Corporation: "Design of physical layer procedures for NR V2X sidelink communication", R1-1904299, XP051707178, Apr. 8, 2019.

(Continued)

*Primary Examiner* — Brenda H Pham
(74) *Attorney, Agent, or Firm* — XSENSUS LLP

(57)          ABSTRACT

Provided are an electronic device, a wireless communication method and a computer-readable storage medium. The electronic device comprises a processing circuit configured to: receive first data and control information of the first data by means of a sidelink, the control information comprising indication information used for indicating the selection and use of a periodic feedback resource; determine a feedback resource for the first data on the basis of the control information of the first data; and send feedback information for the first data by using the determined feedback resource. According to at least one aspect of the embodiments of the present invention, in control information of data transmitted by means of a sidelink, dynamic indication information is added to indicate the selection and use of a periodic feedback resource, so that feedback information can be sent by using the periodic feedback resource in a relatively flexible manner.

17 Claims, 11 Drawing Sheets

(51) Int. Cl.
    *H04W 72/20*      (2023.01)
    *H04W 72/40*      (2023.01)

(56)            References Cited

U.S. PATENT DOCUMENTS

| | | | | |
|---|---|---|---|---|
| 11,824,660 | B2 * | 11/2023 | Lee | H04W 40/12 |
| 2020/0099479 | A1 * | 3/2020 | Park | H04W 4/70 |
| 2020/0112400 | A1 * | 4/2020 | Lee | H04L 1/1819 |
| 2021/0099974 | A1 * | 4/2021 | Wu | H04L 5/0055 |
| 2021/0351896 | A1 * | 11/2021 | Kim | H04W 28/04 |
| 2021/0377935 | A1 * | 12/2021 | Chae | H04B 7/06954 |

OTHER PUBLICATIONS

Spreadtrum Communications, "Discussion on physical layer procedures for sidelink", 3GPP TSG RAN WG1 #97, R1-1906362, May 13-17, 2019, 8 pages.
TCL Communications, "Physical Layer Procedures for Sidelink", 3GPP TSG RAN WG1 Meeting #98, R1-1908279, Aug. 26-30, 2019, 14 pages.
International Search Report and Written Opinion mailed on Aug. 18, 2022, received for PCT Application PCT/CN2022/094955, filed on May 25, 2022, 09 pages including English Translation.

* cited by examiner

400

*800*

*900*

ELECTRONIC DEVICE, WIRELESS COMMUNICATION METHOD, AND COMPUTER-READABLE STORAGE MEDIUM

CROSS-REFERENCE TO RELATED APPLICATIONS

This application is based on PCT filing PCT/CN2022/094955, filed on May 25, 2022, which claims priority to Chinese Patent Application No. 202110608887.2, titled "ELECTRONIC DEVICE, WIRELESS COMMUNICATION METHOD, AND COMPUTER-READABLE STORAGE MEDIUM", filed on Jun. 1, 2021 with the China National Intellectual Property Administration, each of which is incorporated herein by reference in its entirety.

TECHNICAL FIELD

The present application relates to the field of wireless communication technology, more specifically to an electronic device, a method for wireless communications, and a non-transitory computer-readable storage medium suitable for data transmission through a sidelink and providing feedback on the data transmission.

BACKGROUND

In the sidelink communication scenario, both the transmitting end user equipment and the receiving end user equipment may perform communication using a preconfigured resource pool (a set of preconfigured time-frequency resources/time-frequency resource blocks). For example, the transmitting end user equipment may carry data using the Physical Sidelink Share Channel (PSSCH) in the resource pool, and correspondingly carry control information for the PSSCH using the Physical Sidelink Control Channel (PSCCH) or Sidelink Control Information (SCI) in the PSSCH, to transmit the data and the control information to the receiving end user equipment. Correspondingly, the receiving end user equipment may transmit positive (ACK) or negative (NACK) feedback information using the Physical Sidelink Feedback Channel (PSFCH) in the resource pool (such as using the PSFCH corresponding to the PSSCH carrying the data).

The PSFCH in the resource pool is a preconfigured periodic feedback resource that has a feedback period N configured with the relevant parameters of the resource pool. This feedback period, for example, indicates the interval between the time slots where the PSFCH is present among the time slots in the resource pool. For example, N=1 indicates the presence of a PSSCH resource in each time slot, N=2 indicates the presence of a PSSCH resource in every 2 time slots, and so on.

Since the PSFCH in the resource pool has the preconfigured fixed period, the time domain resource of the PSFCH carrying the feedback information is fixed for the data transmission carried by the PSSCH. Therefore, it is not possible to flexibly transmit the feedback information.

SUMMARY

Hereinafter is a brief summary of the present disclosure aiming to provide basic understanding of some aspects in relation to the present disclosure. However, it is to be understood that this summary is not an exhaustive overview of the present disclosure. It is not intended to determine key or important parts of the present disclosure, nor is it intended to limit the scope of the present disclosure. An object of the summary is only to present some concepts on the present disclosure in a simplified form, as a preface of detailed description given later.

In view of the above issues, at least one aspect of the present disclosure is to provide an electronic device, a method for wireless communications, and a non-transitory computer-readable storage medium capable of transmitting feedback information in a relatively flexible manner using the periodic feedback resource for data transmission on side link.

According to an aspect of the present disclosure, an electronic device is provided. The electronic device includes a processing circuitry configured to receive first data and control information for the first data through a side link, where the control information includes indication information for indicating the selection, for use, of a periodic feedback resource; and determine a feedback resource for the first data based on the control information for the first data; and transmit feedback information for the first data using the determined feedback resource.

According to another aspect of the present disclosure, an electronic device is provided. The electronic device includes processing circuitry configured to transmit first data and control information for the first data to a user equipment through a side link, where the control information includes indication information for indicating the selection, for use, of a periodic feedback resource, and is used by the user equipment to determine a feedback resource; and receive from the user equipment feedback information for the first data transmitted using the determined feedback resource.

According to yet another aspect of the present disclosure, a method for wireless communications is also provided. The method includes: receiving first data and control information for the first data through a side link, where the control information includes indication information for indicating the selection, for use, of a periodic feedback resource; and determining a feedback resource for the first data based on the control information for the first data; and transmitting feedback information for the first data using the determined feedback resource.

According to yet another aspect of the present disclosure, a method for wireless communications is also provided. The method includes: transmitting first data and control information for the first data to a user equipment through a side link, where the control information includes indication information for indicating the selection, for use, of a periodic feedback resource, and is used by the user equipment to determine the feedback resource; and receiving from the user equipment feedback information for the first data transmitted using the determined feedback resource.

According to another aspect of the present disclosure, a non-transitory computer-readable storage medium storing executable instructions is also provided. The executable instructions, when executed by a processor, cause the processor to perform the method for wireless communications or functions of the electronic device.

According to other aspects of the present disclosure, a computer program code and a computer program product for implementing the method for wireless communications according to the present disclosure are also provided.

According to at least one aspect of the embodiments of the present disclosure, the dynamic indication information is added to the control information (such as SCI) for the data (such as data carried by PSSCH) transmitted through the side link to indicate the selection, for use, of the periodic feedback resource (such as preconfigured periodic PSFCH), enabling feedback information to be transmitted in a relatively flexible manner using the periodic feedback resource.

Other aspects of the embodiments of the present disclosure are set forth in the following description, in which preferred embodiments for fully disclosing the embodiments of the present disclosure are described in detail without being limited thereto.

BRIEF DESCRIPTION OF THE DRAWINGS

The drawings are only used for illustrating the selected embodiments rather than all possible implementations, and are not intended to limit the scope of the present disclosure. In the drawings.

Figure 1:
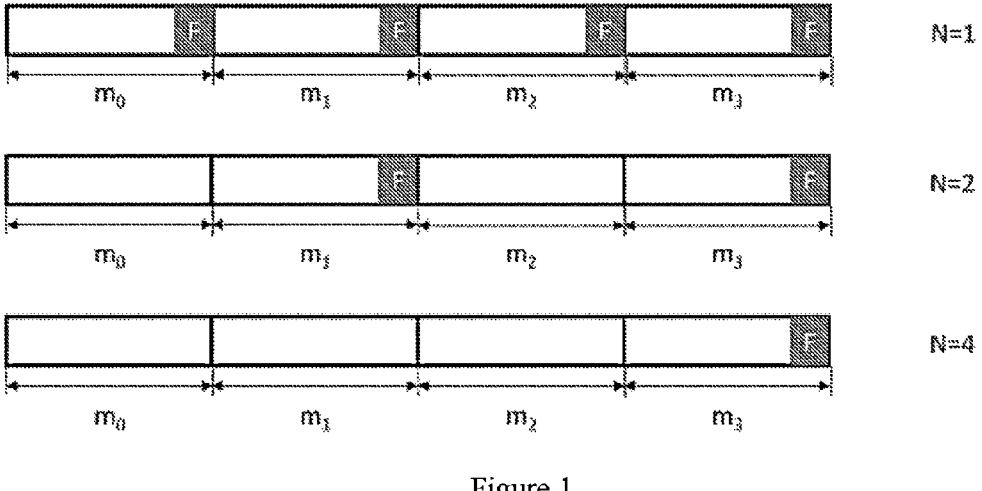
FIG. 1 is a schematic diagram showing a preconfigured feedback period of PSFCH.

Although the present disclosure is easily subjected to various modifications and replacements, specific embodiments thereof, as examples, are shown in the drawings and described in detail here. However, it should be understood that, the description of specific embodiments herein is not intended to limit the present disclosure to the disclosed specific forms. On the contrary, the purpose of the present disclosure is to cover all modifications, equivalents and replacements that fall within the spirit and scope of the present disclosure. It should be noted that throughout the several drawings, corresponding parts are indicated by corresponding reference numerals.

DETAILED DESCRIPTION OF THE EMBODIMENTS

Examples of the present disclosure are fully described with reference to the drawings. The following description is merely exemplary and is not intended to limit the present disclosure and an application or use thereof.

Exemplary embodiments are provided, so that the present disclosure becomes thorough and fully convey the scope thereof to those skilled in the art. Examples of specific components, apparatus, methods and other specific details are set forth to provide detailed understanding of embodiments of the present disclosure. It will be apparent to those skilled in the art that exemplary embodiments may be implemented in many different forms without the use of specific details, and they should not be construed as limiting the scope of the present disclosure. In some exemplary embodiments, well-known processes, structures and technologies are not described in detail.

Description is made in the following order.

1. Overview
2. Configuration example of first embodiment
3. Configuration example of second embodiment
4. Configuration example of third embodiment
5. Example of information interaction process
6. Method embodiments
7. Application examples

1. OVERVIEW

Firstly, a preconfigured feedback period of PSFCH in a resource pool is briefly explained with reference to FIG. 1. FIG. 1 is a schematic diagram showing a preconfigured feedback period of the PSFCH, which shows four time slots $m_0$ to $m_3$ in the resource pool in three cases of the feedback period N=1, 2, and 4. The feedback period may be configured with the relevant parameters for the resource pool. For the four time slots shown in FIG. 1, when N is equal to 1, a feedback resource F is present in each time slot from $m_0$ to $m_3$. When N is equal to 2, a feedback resource F is present in every 2 time slots, namely only time slots $m_1$ and $m_3$. When N is equal to 4, a feedback resource F is present in every 4 time slots, namely only time slot $m_3$. The feedback resource F may appear on a $13^{th}$ OFDM symbol in a corresponding time slot, for example.

For data transmission performed by a transmitting end UE by using PSSCH in the resource pool, a receiving end UE may, for example, provide feedback information, namely ACK/NACK information, on a corresponding PSFCH resource among the periodically configured PSFCH resources as shown in FIG. 1.

Figure 2:
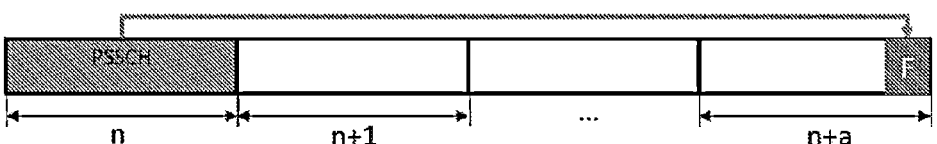
FIG. 2 is a schematic diagram showing time-domain resources of PSFCH corresponding to PSSCH.

FIG. 2 is a schematic diagram showing a time-domain resource of PSFCH corresponding to PSSCH used by a receiving end UE. As shown in FIG. 2, if the receiving end UE receives the transmission of one PSSCH in a time slot n for the resource pool, the UE will provide ACK/NACK information on the corresponding PSFCH resource in a time slot n+a. Here, the time slot n+a is a first time slot (including a time slot n+K itself) where a periodic PSFCH resource is present after K time slots specified by a feedback delay parameter K (i.e., after the time slot n+K). In other words, "a" is a minimum natural number greater than or equal to the feedback delay parameter K, provided that there is a periodic feedback resource in the time slot n+a. For example, in the example of FIG. 1, if the time slot calculated by n+K is time slot $m_0$, in the case of N=1, the time slot n+a is $m_0$; in the case of N=2, the time slot n+a is $m_1$ immediately following $m_0$ where a feedback resource F is present; in the case of N=4, the time slot n+a is $m_3$ immediately following $m_0$ where a feedback resource F is present. It can be seen that when the feedback delay parameter K is fixed, a time domain resource of the PSFCH corresponding to the PSSCH is actually determined by a period of the PSFCH. Therefore, the delay of feedback information is also determined by the period of the PSFCH, for the data transmission carried by the PSSCH. That is, the smaller the period of the PSFCH configured in the resource pool, the shorter the feedback delay.

In addition, a feedback period, namely a PSFCH period, also determines a frequency of switching between a sender and a receiver performing the side link communication. It can be understood that when the receiving end UE transmits feedback information using the PSFCH resource in the time slot n+a, a transmitting end UE and a receiving end UE are subject to role switching between a sender and a receiver. That is, the UE as the data receiver becomes the sender of the feedback information, and the UE as the data sender becomes the receiver of the feedback information. Next, if the transmitting end UE continues to transmit data, the identities of the transmitting end UE and the receiving end UE are switched again. That is, the transmitting end UE, as the receiver of the feedback information, changes back to the data sender, and the receiving end UE, as the sender of the feedback information, changes back to the data receiver. The frequency of switching between the sender and the receiver is determined by the period of the PSFCH. That is, the smaller the period of the PSFCH configured in the resource pool, the more frequent the switching between the sender and the receiver.

Figure 3:
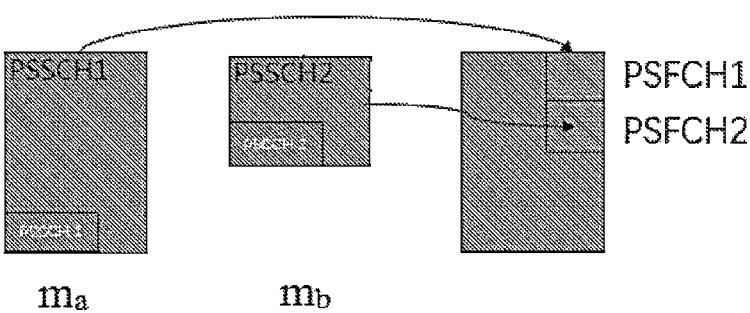
FIG. 3 is a schematic diagram showing a frequency-domain resource of PSFCH corresponding to PSSCH.

FIG. 3 is a schematic diagram showing a frequency domain resource of PSFCH corresponding to PSSCH used by a receiving end UE. As shown in FIG. 3, for different PSSCHs, namely PSSCH1 in a time slot ma and PSSCH2 in a time slot $m_b$, the receiving end UE may use PSFCH1 and PSFCH2 corresponding to PSSCH1 and PSSCH2 with different frequency domain resources, respectively. The frequency domain correspondence between the PSSCH resource and the PSFCH resource may be determined based on the relevant parameters in configuration information for a resource pool. For example, the PSSCH in the resource pool may be divided into different PSSCH subchannels in the frequency domain. Moreover, a frequency domain position of the PSSCH resource may be determined according to the time slot where the PSSCH is present and an index of the PSSCH subchannel based on the configuration information for the resource pool, for example. That is, after determining the time slot n+a where the feedback resource of the PSSCH is present based on the time slot where the PSSCH is present, the PSFCH resource may be determined based on the index of the PSSCH subchannel from candidate PSSCH resources corresponding to the time slot n+a (i.e., the frequency domain resource of the feedback resource is determined). The relevant parameters in the configuration information for the resource pool may be set to specify, for each PSSCH subchannel, one or more candidate PSFCHs corresponding to each PSSCH subchannel, so that PSFCHs for different PSSCHs do not conflict with each other.

As mentioned earlier, since the PSFCH in the resource pool has the preconfigured fixed period, the time domain resource of the PSFCH carrying the feedback information is fixed, for the data transmission carried by the PSSCH, and is, for example, determined based on the time slot where the PSSCH carrying the data is present, the feedback delay parameter K, and the period of the PSFCH. Therefore, the feedback information cannot be flexibly transmitted.

In view of the above issues, the inventor proposed the inventive concept of the present disclosure. Dsynamic indication information is added to the control information for the PSSCH (such as SCI, such as a first stage SCI on PSCCH, i.e., SCI-1 or a second stage SCI on PSSCH, i.e., SCI-2) to indicate the selection, for use, of the preconfigured periodic PSFCH, thereby enabling to transmit the feedback information in a relatively flexible manner using the periodic feedback resource.

2. CONFIGURATION EXAMPLE OF FIRST EMBODIMENT

Figure 4:
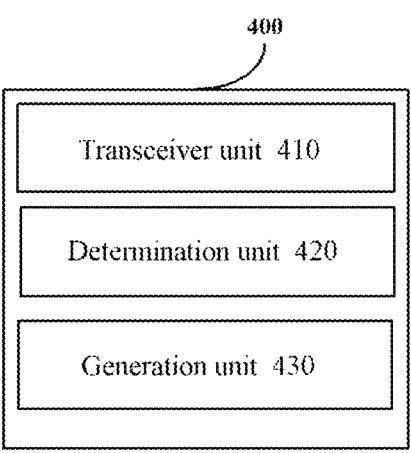
FIG. 4 is a block diagram showing a configuration example of an electronic device according to a first embodiment of the present disclosure.

FIG. 4 is a block diagram showing a configuration example of an electronic device according to a first embodiment of the present disclosure.

As shown in FIG. 4, an electronic device 400 may include a transceiver unit 410, a determination unit 420 and a generation unit 430.

Here, each unit of the electronic device 400 may be included in a processing circuitry. It should be noted that, the electronic device 400 may include one or more processing circuitry. Further, the processing circuitry may include various discrete functional units for performing various functions and/or operations. It should be noted that these functional units may be physical entities or logical entities, and units with different names may be implemented by a same physical entity.

The electronic device 400 shown in FIG. 4 may be various types of user equipment capable of performing side link communication. In the following, the electronic device 400 serving as the receiving end user equipment for data transmission will be described as an example.

According to this embodiment, the transceiver unit 410 may be configured to receive first data and control information for the first data through a side link. The control information includes indication information for indicating the selection, for use, of a periodic feedback resource (suitable for side link communication). The control information received by the transceiver unit 410 for each data transmission specifies through the indication information the selection, for use, of the periodic feedback resource. Such indication information may also be referred to as dynamic indication information/fields, which facilitates the flexible use of the periodic feedback resource.

For example, the first data received by the transceiver unit 410 through the side link may be carried by the PSSCH in a preconfigured resource pool, and the control information of the first data may be SCI (such as SCI-1 or SCI-2) carried by the PSCCH or the PSSCH in the preconfigured resource pool, and may include necessary control information related to the PSSCH in the conventional technology (such as but not limited to an ID of the transmitting end user equipment, priority information of the PSSCH, etc.) and additionally include the indication information defined in this embodiment. The periodic feedback resource may be the PSFCH in the preconfigured resource pool.

Preferably, the transceiver unit 410 may also be configured to obtain configuration information for the resource pool in advance from a network side device. The configuration information may include configuration information related to PSSCH, PSCCH, PSFCH, and the like, in the resource pool. For example, the configuration information for the resource pool may include relevant parameters regarding the feedback period N of the PSFCH to specify the period of the PSFCH. In addition, the configuration information for the resource pool may also include a feedback delay parameter K regarding the PSFCH. In addition, the configuration information for the resource pool may also include relevant parameters and/or predetermined rules for determining a frequency domain correspondence between the PSSCH resource and associated PSFCH resource.

In a preferred embodiment, the indication information included in the control information such as SCI may include an interval period indication field, which indicates the number of periods $N_{gap}$ of the feedback resources by which the feedback resource selected for use is spaced from the first available feedback resource. Here, the first available feedback resource is, for example, the feedback resource PSFCH in the time slot n+a determined based on the time slot n for the PSSCH carrying data in the resource pool and the feedback delay K, in a manner as described above with reference to FIG. 2. "a" is a minimum natural number greater than or equal to the feedback delay parameter K, provided that the periodic feedback resource (PSFCH) is present in the time slot n+a. As mentioned earlier, when the feedback delay parameter K is fixed, the time domain resource of the PSFCH corresponding to the PSSCH is actually determined by the period of the PSFCH. Therefore, in the following, for the convenience of description, the feedback delay parameter K=0 is taken as an example for description (when K is a value greater than 0, it is equivalent to extending the time domain resource of the PSFCH corresponding to the PSSCH by k time slots).

The interval period indication field of the indication information may be, for example, a bit sequence with a fixed length. For example, the indication information of a bit sequence with a length of 4 indicates that the number of periods $N_{gap}$ of the feedback resources by which the feedback resource selected for use is spaced from the first available feedback resource may be 0 to 15, which means a maximum of 15 feedback periods N may be skipped.

The determination unit 420 may be configured to determine the feedback resource for the first data based on the control information for the first data. For example, the determination unit 420 may select the PSFCH used at least partially based on the indication information included in the control information, such as SCI, from the periodic PSFCHs in the preconfigured resource pool. When the indication information indicates the number of periods $N_{gap}$ of the feedback resources by which the feedback resource selected for use is spaced the first available feedback resource, for example, through the interval period indication field, the determination unit 420 may delay the time slot n+a for the first available feedback resource by the number of time slots $N_{gap}*N$ specified by the number of periods $N_{gap}$, to determine to use the PSFCH in the time slot $n+a+N_{gap}*N$.

In addition, the determination unit 420 may determine the frequency domain resource of the PSFCH used based on the configuration information for the resource pool, according to a time domain position of the determined feedback resource (the time slot where the PSFCH is present) and the frequency domain resource of the PSSCH carrying the data (such as the PSSCH subchannel where the PSSCH is present), for example. As mentioned earlier, in general, the PSFCH resource corresponding to the PSSCH subchannel of the PSSCH may be determined based on the configuration information for the resource pool from the candidate PSFCH resources in the time slot n+a where the feedback resource of the PSSCH is present. In this embodiment, after determining the time slot $n+a+N_{gap}*N$ where the the feedback resource of the PSSCH, namely the PSFCH resource, is present, the PSFCH resource corresponding to the PSSCH subchannel may be determined based on the configuration information for the resource pool from the candidate PSFCH resources corresponding to that time slot (i.e., the frequency domain resource of the PSFCH is determined).

The generation unit 430 may be configured to generate feedback information for the first data, such as ACK/NACK information that represents positive or negative, respectively. As an example, the feedback information may be 1-bit information feedback through a cyclic displacement sequence. The transceiver unit 410 may be configured to transmit the feedback information generated by the generation unit 430 using the feedback resource determined by the determination unit 420.

By utilizing the electronic device 400 of this embodiment, the feedback information may be transmitted based on the dynamic indication information included in the control information using the periodic feedback resource in a relatively flexible manner. Therefore, the problem of mismatch between the preconfigured period of the feedback resource and the data delay requirements in the actual application can be solved.

In a preferred embodiment, the transceiver unit 410 of the electronic device 400 may be further configured to receive one or more second data and control information of the second data through a side link. The control information includes the indication information for indicating the selection, for use, of the periodic feedback resource. The indication information for the second data and the indication information for the first data indicate to select and use the feedback resources in the same period. Based on such control information (the indication information included in the control information), the electronic device 400 may determine the feedback resources in the same period through the determination unit 420, and transmit through the transceiver unit 410 the feedback information for the first data and the feedback information for the second data generated by the generation unit 430 using the feedback resources in the same period.

In this way, in this preferred embodiment, the feedback information for the first data and the feedback information for the second data are transmitted using the feedback resources in the same period, thereby reducing the number of switches between the sender and receiver in the side link communication. As mentioned earlier, in the conventional technology, the frequency of switching between the sender and the receiver is determined by the period of the feedback resource, namely the PSFCH. The smaller the period of the PSFCH configured in the resource pool, the more frequent the switching between the sender and the receiver. If the feedback period configured in the resource pool is small, it will result in frequent switching between the sender and the receiver, and PSFCH transmission, resulting in significant energy consumption and resource overhead. If the configured feedback period is long, timely feedback cannot be guaranteed for certain delay sensitive services. By utilizing the configuration of this preferred embodiment, the number of switches can be reduced in a flexible manner on the basis of the already configured feedback period.

Figure 5:
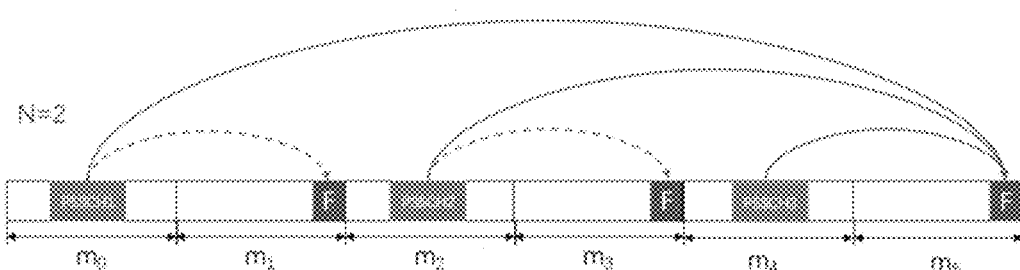
FIG. 5 is a diagram showing an exemplary scenario for the selection, for use, of periodic PSFCH according to an embodiment of the present disclosure.

FIG. 5 is a diagram showing an example scenario for the selection, for use, of periodic PSFCH according to an embodiment of the present disclosure, which shows an example implementation scenario of the preferred embodiment mentioned above. In the example of FIG. 5, multiple time slots $m_0$ to $m_5$ with a feedback period N=2 are shown. The electronic device 400 as the receiving end UE receives multiple data through a side link. The first data is transmitted through PSSCH1 in a time slot $m_0$, one piece of the second data is transmitted through PSSCH2 in a time slot $m_2$, and the other piece of the second data is transmitted through PSSCH3 in a time slot $m_4$.

For ease of description, in this example, a feedback delay parameter K=0 is set. Therefore, a time slot n+a for the first available feedback resource PSFCH determined based on the time slot n for the PSSCH carrying data in the resource pool and the feedback delay K=0 is the time slot where the periodic feedback resource PSFCH is first present after the time slot n. That is, the time slots where the first available PSFCHs (shown as F in FIG. 5) for the data carried each by PSSCH1, PSSCH2, and PSSCH3 are present are respectively time slots $m_1$, $m_3$, and $m_5$. If the conventional technology is followed, the receiving end UE makes a feedback using the PSFCH in each of these three time slots, and the switch between the sender and the receiver occurs with each feedback.

In contrast, with this preferred embodiment, the control information of the data received by the receiving end UE with the functional configuration of the electronic device 400, respectively carried by PSSCH1, PSSCH2, and PSSCH3, may include indication information, and each piece of indication information, for example, indicates $N_{gap1}$=2, $N_{gap2}$=1, and $N_{gap3}$=0 through an interval period indication field. In this way, the indication information in the control information for the data respectively carried by PSSCH1, PSSCH2, and PSSCH3 specifies that the number of periods between the PSFCHs selected for use and the PSFCHs in the respective first available time slots $m_1$, $m_3$, and $m_5$ is 2, 1, 0, respectively (i.e., the interval number of time slots is 2*2=4, 2*1=2, 0, respectively), Thus, the electronic device may use uniformly PSFCH in time slot $m_5$ to transmit feedback information for each data as shown by the solid arrow in FIG. 5. That is, the switch between the sender and receiver is only performed once.

In this preferred embodiment, the frequency domain resource of the feedback resources in the same period (time slot) is not specifically defined. As an example, the determination unit 420 of the electronic device 400 may determine the PSFCH to be used based on the configuration information for the resource pool, according to the PSSCH carrying the data (such as according to a subchannel index of the PSSCH), among the candidate PSFCH resources corresponding to the time slot where the feedback resource for the PSSCH is present. That is, the determination unit 420 may determine the PSFCH resources corresponding to the respective subchannels of PSSCH1, PSSCH2, and PSSCH3 among the candidate PSFCH resources corresponding to time slot $m_5$. In the case that PSSCH1, PSSCH2, and PSSCH3 each have a different subchannel index, three different PSFCHs (not shown in the figure) may be used.

In a further preferred embodiment, the determination unit 420 of the electronic device 400 may also be configured to determine frequency domain resource for the feedback resource for each data based on an ID of the user equipment transmitting each data and an ID of the electronic device itself. Here, the electronic device 400 may obtain, from the control information for each data received through the transceiver unit, the ID of the user equipment transmitting the data, for example.

In this preferred embodiment, as a basic example, the determination unit 420, after determining the time slot where the feedback resource for the PSSCH carrying data, i.e. the PSFCH resource, is present, may determine multiple PSFCH resources corresponding to the subchannels of the PSSCH based on the configuration information for the resource pool, from the candidate PSFCH resources corresponding to the time slot, and further calculate the remainder of the total number of these PSFCH resources using the sum of the ID of the transmitting end UE and the ID of the receiving end electronic device 400, to select the PSFCH resource with the index corresponding to the remainder (i.e., determine the frequency domain resource of the feedback resource).

According to an example of the present preferred embodiment, when the electronic device 400 receives the first data and the control information thereof, as well as the second data and the control information thereof, from the first user equipment and the second user equipment respectively through a side link, even if the indication information of the control information for both the first data and the second data indicates to select and use the feedback resources in the same period, the determination unit 420 may also determine the feedback resources with different frequency domain resources for the first data and second data. Therefore, in this preferred embodiment, frequency domain multiplexing is implemented for the feedback information for data from different transmitting end UEs.

On the other hand, according to another example of this preferred embodiment, when electronic device 400 receives the first data, the second data, and their respective control information from the same user equipment through a side link, if the indication information of the control information for both the first data and second data indicates to select and use the feedback resources in the same period, the determination unit 420 may further determine the feedback resources with different frequency domain resources or the same frequency domain resource for the first data and the second data. Here, the first data and second data may be carried on different PSSCHs of the same transmitting end UE, separately.

Firstly, the first case is considered, which is an example case where the determination unit 420 determines the feedback resources with different frequency domain resources for the first data and second data (carried on different PSSCHs) from the same transmitting end UE that select to use the feedback resources in the same period. In this example, the determination unit 420, after determining the time slot where the feedback resource for the PSSCH carrying data, i.e. the PSFCH resource is present, may determine in a similar manner to the basic example, multiple PSFCH resources corresponding to the subchannels of the PSSCH based on the configuration information for the resource pool, from the candidate PSFCH resources in the time slot, and further determine, for the determined PSFCH resources, the PSFCH resources to be used based on the ID of the transmitting end UE and the ID of the receiving end electronic device 400. In this example, since the first data and the second data are respectively carried on different PSSCHs for the same transmitting end UE (such as corresponding to different PSSCH subchannels), the feedback resources determined in the above way for the first data and the second data are also different (i.e., the feedback resources with the same time domain resources and the different frequency domain resources).

Next, the case of the second variant example is considered, which is an example case, where the determination unit 420 determines the feedback resources with the same frequency domain resources for the first data and the second data (carried on different PSSCHs) from the same transmitting end UE that select to use the feedback resources in the same period.

In this variant example, in a preferred implementation, the determination unit 420, after determining the feedback resource (such as the feedback resource in a given period/time slot determined based on the interval period indication field in the indication information) in the corresponding period for the current data, may further determine whether the data is the first data of the transmitting end UE transmitting the data that uses the feedback resource in the corresponding period. For example, the determination unit 420 may set and maintain, for the period $Period_i$ (or time slot $m_i$) for each determined feedback resource, a timer $Timer_{i,j}$ with respect to data from the transmitting end UEj, to achieve the determination of the "first data" mentioned above, where i is a non negative integer representing the period (or time slot) number of the determined feedback resource, and j is a non negative integer representing the UE number. The determination unit 420 sets an initial value of the timer $Timer_{i,j}$ to 0, and increments the value of the timer $Timer_{i,j}$ by 1 for updating each time when the feedback resource in the period $Period_i$ (or time slot $m_i$) is determined for data from the transimtting end UEj, and determine in a corresponding manner the frequency domain resource of the feedback resource for the current data based on whether the updated value of the $Timer_{i,j}$ is equal to 1 or greater than 1.

More specifically, on the one hand, when the value of the time $Timer_{i,j}$ is 1, indicating that the current data is the first data of the transmitting end UEj transmitting the data that uses the feedback resource in the corresponding period $Period_i$ (or time slot $m_i$), the determination unit 420 may, for example, determine, in a similar manner to the basic example or the first case mentioned above, multiple PSFCH resources corresponding to the subchannels of the PSSCH carrying the data based on the configuration information for the resource pool, from the candidate PSFCH resources in the period $Period_i$ (or time slot $m_i$) where the feedback resource of the data, i.e., the PSFCH resource is present, and further determine the PSFCH resource to be used based on the ID of the transmitting end UEj and the ID of the receiving end electronic device 400. On the other hand, when the value of the time $Timer_{i,j}$ is greater than 1, indicating that the current data is not the first data of the transmitting end UEj transmitting the data that uses feedback resource in the corresponding period $Period_i$, the determination unit 420 may continue to use the feedback resource determined in the aforementioned manner for the first data.

Alternatively, in an alternative implementation of the present variant example, the indication information of the control information for each data received by the electronic device through the transceiver unit may include additional indication flag, such as 1 bit, which used to indicate whether the data is the first data of the transmitting end UE transmitting the data that uses the feedback resource (the feedback resource in the given period/time slot determined based on the interval period indication field in the indication information) in the corresponding period $Period_i$ (or time slot $m_i$).

On the one hand, when the indication flag, is for example 1, indicating that the current data is the first data of the transmitting end UE transmitting the data that uses the feedback resource in the corresponding period $Period_i$ (or time slot $m_i$), the determination unit 420 may, for example, determine, in a similar manner to the basic example or the first case mentioned above, multiple PSFCH resources corresponding to the subchannels of the PSSCH carrying the data based on the configuration information for the resource pool, from the candidate PSFCH resources in the period $Period_i$ (or time slot $m_i$) where the feedback resource for the data, i.e., the PSFCH resource, is present, and further determine PSFCH resources to be used based on the ID of the transmitting end UE and the ID of the receiving end electronic device 400. On the other hand, when the indication flag, is for example 0, indicating that the current data is not the first data of the transmitting end UE transmitting the data that uses the feedback resource in the corresponding period $Period_i$ (or time slot $m_i$), the determination unit 420 may continue to use the feedback resource determined in the aforementioned manner for the first data.

In the case of the above variant example, due to the determination of the same PSFCH resource (PSSCH in the same period/time slot and with the same frequency domain resource) for the first data and the second data, it is not possible to use the feedback information in the form of cyclic displacement sequence that can only carry one bit in the conventional technology. Therefore, in an example of this preferred embodiment, the generation unit 430 of the electronic device 400 may generate feedback information using a feedback codebook (such as a Hybrid Automatic Repeat request (HARQ) codebook on a Uu port), so that the generated feedback information can carry information of multiple bits. In this example, code division multiplexing of the feedback information for multiple data from the same sender is achieved by generating the feedback information using the codebook.

Figure 6:
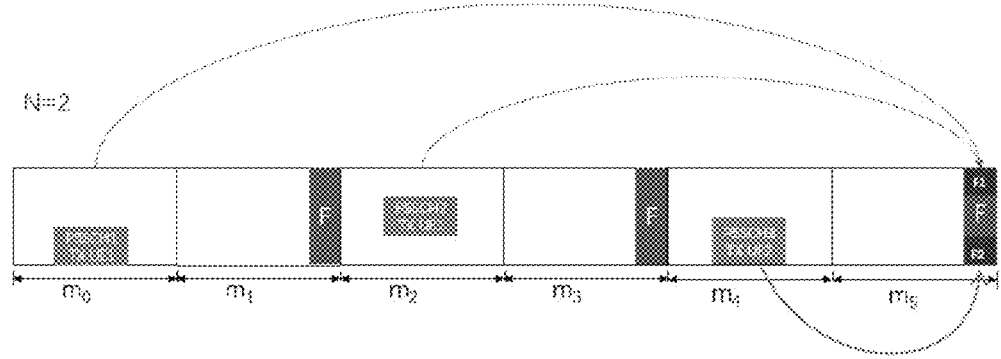
FIG. 6 is a diagram showing another exemplary scenario for the selection, for use, of periodic PSFCH according to an embodiment of the present disclosure.

FIG. 6 is a diagram showing an example scenario for the selection, for use, of periodic PSFCH according to the embodiment of the present disclosure, which illustrates an example implementation scenario of the preferred embodiment mentioned above (involving a second variant example). In the example of FIG. 6, multiple time slots $m_0$ to $m_5$ in the case of feedback period N=2 are shown. The electronic device 400, as the receiving end UE, receives multiple data through a side link. The first data from user equipment TX UE1 as the transmitting end is transmitted in a time slot $m_0$ through PSSCH1 transmitted by the TX UE1, and the second data from TX UE1 is transmitted in a time slot $m_2$ through PSSCH2 transmitted by the TX UE1, and the second data from another user equipment TX UE2 as the transmitting end is transmitted in a time slot $m_4$ through PSSCH3 transmitted by TX UE2.

For ease of description, in this example, a feedback delay parameter K=0 is set. The time slots where the first available PSFCHs (shown as F in the figure) for the data carried by each of the PSSCH1 of TX UE1, the PSSCH2 of TX UE1, and the PSSCH3 of TX UE2 are present are time slots $m_1$, $m_3$, and $m_5$ respectively. In addition, interval period indication fields of the indication information in the control information for these data indicate $N_{gap1}=2$, $N_{gap2}=1$, and $N_{gap3}=0$, respectively, thereby uniformly specifying the selection and use of PSFCH in a time slot $m_5$ to transmit feedback information for each data. In this example, it is assumed that the data carried by the PSSCH1 of TX UE1 in the time slot $m_0$ is the first data of the TX UE1 transmitting the data that uses the feedback resource in the time slot $m_5$ and the data carried by the PSSCH3 of TX UE2 in the time slot $m_4$ is the first data of the TX UE2 transmitting the data that uses the feedback resource in the time slot $m_5$.

In this example scenario, after determining the feedback resource in the time slot $m_5$ for each data carried by the PSSCH1 of TX UE1, the PSSCH2 of TX UE1, and the PSSCH3 of TX UE2, the electronic device 400 may, for example, update a value of a timer $Timer_{5,j}$ set for time slot $m_5$ with respect to data from the transmitting end UEj in increments of 1, in a manner as described in the above variant example, and determine, based on the updated value, whether the corresponding data is the first data of the transmitting end UEj (j=1,2) that uses the feedback resource in the time slot $m_5$ and accordingly determine the frequency domain resource of the feedback resource for the data in a corresponding manner.

For example, for the example scenario shown in FIG. 6, for example, when the electronic device 400 receives indication information of control information for the PSSCH1 data of TX UE1 in the time slot $m_0$, the determination unit 420 determines to select the feedback resources in the time slot $m_5$ for the current data based on the indication information, and updates the value of a timer $Timer_{5,1}$ set for the time slot $m_5$ with respect to data from the TX UE1 in increments of 1. Since the current data carried by the PSSCH1 of TX UE1 in the time slot $m_0$ is the first data of the TX UE1 transiting the data that uses the feedback resource in the time slot $m_5$, $Timer_{5,1}=0$ before the update and $Timer_{5,1}=1$ after the update. The determination unit 420 may determine based on the updated $Timer_{5,1}=1$ that the PSSCH1 data of the TX UE1 in the time slot $m_0$ is the "first data" mentioned above, and thus may determine multiple PSFCH resources corresponding to the subchannels of the PSSCH1 based on the configuration information for the resource pool, from the feedback resources for the data, i.e., the candidate PSFCH resources F in the slot $m_5$, and further determine the PSFCH resource F1 (PSFCH1) selected for used from these PSFCH resources based on the ID of the TX UE1 and the ID of the electronic device 400 itself.

On the other hand, when the electronic device 400 receives the indication information of the control information for the PSSCH2 data of TX UE1 in the time slot $m_2$, the determination unit 420 determines to select the feedback resources in the time slot $m_5$ for the current data based on the indication information, and updates the value of the timer $Timer_{5,1}$ in increments of 1 again to obtain a updated result $Timer_{5,1}=2$. The determination unit 420 may determine based on the updated $Timer_{5,1}=2$ that the PSSCH2 data of the TX UE1 in the time slot $m_2$ is not the first data of the TX UE1 transmitting the data that uses the feedback resource in the time slot $m_5$, and thus may determine the feedback resource F1 (PSFCH1) that uses the first data from the same TX UE1 (i.e. the PSSCH1 data of the TX UE1 in the time slot $m_0$) for the data.

In addition, when the electronic device 400 receives the indication information of the control information for the PSSCH3 data of the TX UE2 in the time slot $m_4$, the determination unit 420 determines to select the feedback resources in the time slot $m_5$ for the current data based on the indication information, and updates the value of a timer $Timer_{5,2}$ set for the time slot $m_5$ with respect to data from the TX UE2 in increments of 1. Since the data carried by the PSSCH3 of TX UE2 in the time slot $m_4$ is the first data of the TX UE2 transmitting the data that uses the feedback resource in the time slot $m_5$, $Timer_{5,2}=0$ before the update and $Timer_{5,2}=1$ after the update. The determination unit 420 may determine based on the updated $Timer_{5,2}=1$ that the PSSCH3 data of the TX UE2 in the time slot $m_4$ is the "first data" mentioned above, and may thus determine multiple PSFCH resources corresponding to the subchannels of the PSSCH3 based on the configuration information for the resource pool, from the feedback resources for the data, i.e., the candidate PSFCH resources F in the time slot $m_5$, and further determine the PSFCH resource F2 (PSFCH2) selected for use from these PSFCH resources based on the ID of the TX UE2 and the ID of the electronic device 400 itself.

Figure 7:
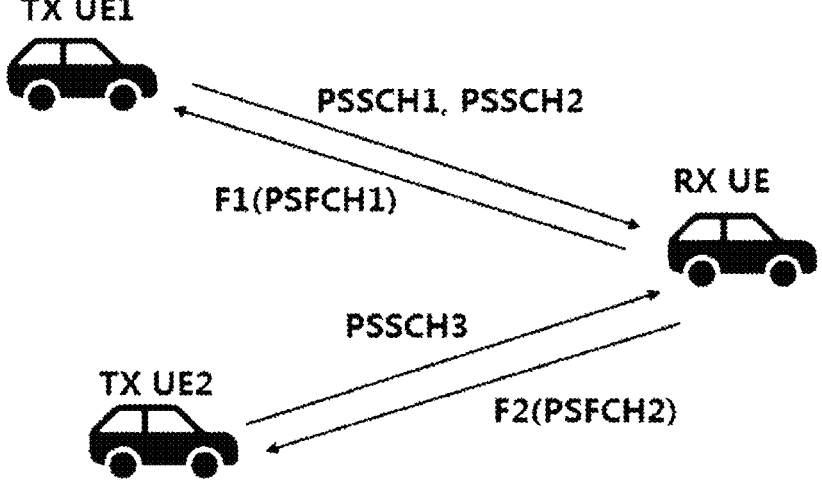
FIG. 7 is a diagram schematically showing interaction between a transmitting end and a receiving end in the exemplary scenario of FIG. 6.

FIG. 7 schematically illustrates the interaction between transmitting ends TX UE1, and TX UE2, and a receiving end RX UE (with functional configuration of the electronic device 400) in the example scenario of FIG. 6. As shown in FIG. 7, for the data from PSSCH1 and PSSCH2 of TX UE1, RX UE uniformly uses feedback resource F1 (PSFCH1) for feedback. For data from PSSCH3 of the TX UE2, the RX UE uses feedback resource F2 (PSFCH2) for feedback. F1 (PSFCH1) and F2 (PSFCH2) are in the same period (same time slot) but have different frequency domain resources. Therefore, frequency division multiplexing of the feedback information is achieved for the data from user equipment from different transmitting ends.

In the above description, the electronic device 400, as the receiving end UE, may determine feedback resources for all data it receives through the side link, and transmit the feedback information for each data with the determined feedback resources. In practical applications, there may be a scenario where the transmitting of the feedback information for all data with the determined feedback resources may exceed the ability of the electronic device 400 itself. As mentioned earlier, the periodic feedback resource PSFCH may appear on the $13^{th}$ OFDM symbol in the corresponding time slot, and the number of PSFCHs that can be transmitted for each OFDM symbol may be limited in practical applications. For example, currently, for each OFDM symbol, a maximum of $M_{max}=3$ PSFCHs may be transmitted (there are 3 occasions to transmit the PSFCH). Therefore, when the determination unit 420 determines that feedback information for data exceeding $M_{max}$ needs to be transmitted on feedback resources in the same period (same time slot), it can determine that such transmission will exceed the ability of the electronic device 400 itself.

Therefore, in a preferred embodiment, the determination unit 420 may be further configured to determine whether the transmitting of the feedback information for each data with the determined feedback resources exceeds the transmission ability of the electronic device. When it is determined that the transmission ability of the electronic device is exceeded, the electronic device 400 may perform one or both of the following processes of: transmitting, using the transceiver unit 410, preferentially the feedback information for data carried by the PSSCH with high priority based on the determined feedback resources; and/or redetermining, using the determination unit 420, the feedback resources with the same frequency domain resources for multiple data received from the same user equipment, and transmitting, using the transceiver unit 410, the feedback information for multiple data received from the same user with the redetermined feedback resources.

In the first process mentioned above, the determining unit 420 may determine the PSSCH with high priority, for example, based on the information specifying the priority of the PSSCH carried in the control information for the PSSCH, and the transceiver unit 410 may transmit preferentially the feedback information for the data carried by the PSSCH with high priority using the determined feedback resources. In this way, the feedback information for the data carried by the PSSCH with high priority may be preferentially transmitted to at least ensure the effective feedback on the data carried by PSSCH with high priority.

In the second process mentioned above, the determination unit 420 may determine whether the data comes from the same transmitting end UE, for example based on the ID of the user equipment transmitting the PSSCH carried in the control information for the PSSCH carrying each data, i.e., the ID of the transmitting end UE, redetermine the feedback resources with the same frequency domain resources for multiple data (which are carried on different PSSCHs) from the same transmitting end UE that select to use feedback resources in the same period, according to the process as described in the above variation example (such as the processes described with reference to FIGS. 6 and 7), for example, in the case that the data comes from the same transmitting end UE. The transceiver unit 410 may transmit the feedback information for multiple data from the same transmitting end UE using the feedback resources redetermined in this way. Here, the feedback information transmitted by the transceiver unit 410 may be, for example, the feedback information capable of carrying multiple bits of information, generated by the electronic device 400 through the generation unit 430 using a feedback codebook (such as a HARQ codebook of a Uu port). By utilizing the above processes, code division multiplexing of the feedback information is achieved for multiple data from the same transmitting end UE, and the ability to transmit the feedback information is enhanced.

In addition, in the above description, the case where the periodic feedback resource has a fixed feedback period is described as an example. In a preferred embodiment, the configuration information for the periodic feedback resource obtained in advance from a network side device by the electronic device 400, for example, through the transceiver unit 410, may specify one or more candidate periods for the periodic feedback resource. In this case, before the transmitting end user equipment and the electronic device 400 perform data transmission on the side link, both of them may for example, communicate in advance, to determine the period of the currently used periodic feedback resource. For example, the electronic device 400 may receive the control information specifying the period (feedback period) of the periodic feedback resource selected for use from the transmitting end user equipment through the transceiver unit 410, and perform subsequent process (i.e., the process previously described with reference to FIGS. 4 to 7) based on the period of the feedback resource specified by the control information. Alternatively, the electronic device 400 may receive and read the additional feedback period field attached to the control information for each data for specifying the currently used feedback period during the data transmission on the side link, and perform corresponding process (i.e., the process previously described with reference to FIGS. 4 to 7) based on the period of the feedback resource specified in the field.

Optionally, the electronic device 400 may obtain multiple sets of configuration information in advance from the network side device through the transceiver unit 410, where each set of configuration information is associated with a corresponding data service and specifies one or more candidate periods. As an example, a set of configuration information associated with Ultra Reliable and Low Latency Communications (URLLC) service that is sensitive to latency may specify a set of shorter candidate feedback periods {1, 2, 4}. A set of configuration information associated with Enhanced Mobile Broadband (eMBB) service that is relatively insensitive to latency may specify a set of longer candidate feedback periods {8,16}.

In this case, before or during the transmitting end user equipment and the electronic device 400 carry out the data transmission of the given data service on the side link, the electronic device 400 may receive the control information specifying the feedback period selected for use associated with the current data service from the transmitting end user equipment through the transceiver unit 410, and perform corresponding process (i.e., the process previously described with reference to FIGS. 4 to 7) based on the period of the feedback resources specified by the control information.

3. CONFIGURATION EXAMPLE OF SECOND EMBODIMENT

Figure 8:
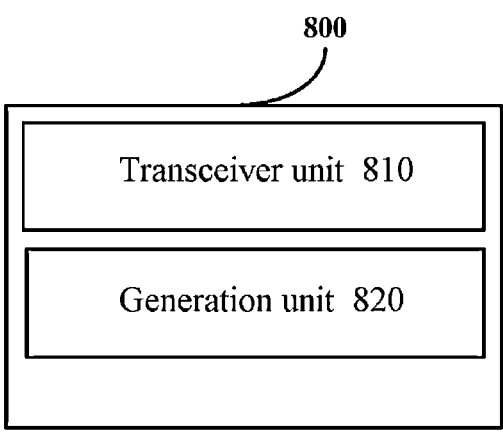
FIG. 8 is a block diagram showing a configuration example of an electronic device according to a second embodiment of the present disclosure.

FIG. 8 is a block diagram showing a configuration example of an electronic device according to a second embodiment of the present disclosure.

As shown in FIG. 8, an electronic device 800 may include a transceiver unit 810, a generation unit 820, and optionally a determination unit (not shown).

Here, each unit of the electronic device 800 may be included in a processing circuitry. It should be noted that, the electronic device 800 may include one or more processing circuitry. Further, the processing circuitry may include various discrete functional units for performing various functions and/or operations. It should be noted that these functional units may be physical entities or logical entities, and units with different names may be implemented by a same physical entity.

The electronic device 800 shown in FIG. 8 may be various types of user equipment capable of performing side link communication. Hereinafter, the user device 800 as the transmitting end user equipment for data transmission will be described as an example, and it may, for example, interact with the electronic device 400 as the receiving end user equipment for data transmission in the first embodiment described above (side link communication). For various details not described here, reference is made to the example of configuration and process of the electronic device 400 described above.

According to this embodiment, the transceiver unit 810 may be configured to transmit first data and control information for the first data generated for example, by the generation unit 820 (described later) through the side link. The control information includes indication information for indicating the selection, for use, of periodic feedback resource (suitable for side link communication). Since the control information for each data transmission carried out by the transceiver unit 810 specifies the selection, for use, of the periodic feedback resource through the indication information the control information, such indication information may also be referred to as dynamic indication information/fields, which is conducive to the flexible use of the periodic feedback resource.

As an example, the first data transmitted by the transceiver unit 810 through the side link may be carried by PSSCH in a preconfigured resource pool. The control information for the first data may be SCI (such as SCI-1 or SCI-2) carried by PSCCH or PSSCH in the preconfigured resource pool, and may include the necessary control information in the conventional technology related to the PSSCH (such as but not limited to an ID of the electronic device 800 itself, priority information of the PSSCH, etc.), and additionally include the indication information defined in this embodiment. The periodic feedback resource may be the PSFCH in the preconfigured resource pool.

Preferably, the transceiver unit 810 may also be configured to obtain configuration information for the resource pool in advance from a network side device, for example. The configuration information may include the configuration information related to PSSCH, PSCCH, PSFCH, and so on in the resource pool. For example, the configuration information for the resource pool may include relevant parameters regarding the feedback period N of PSFCH to specify the period of the PSFCH. In addition, the configuration information of the resource pool may also include a feedback delay parameter K regarding the PSFCH. In addition, the configuration information for the resource pool may also include relevant parameters and/or predetermined rules for determining the frequency domain correspondence between the PSSCH resource and the associated PSFCH resource.

The generation unit 820 may be configured to generate the control information for the first data transmitted through the side link. As mentioned earlier, the control information generated by the generation unit 820 may be SCI (such as SCI-1 or SCI-2) carried by the PSCCH or the PSSCH in the preconfigured resource pool, and may include the necessary control information in the conventional technology related to the PSSCH (such as but not limited to an ID of the electronic device 800 itself, priority information of the PSSCH, etc.), and additionally include the indication information defined in this embodiment.

In a preferred embodiment, the indication information generated by the generation unit 820 in the control information such as SCI may include an interval period indication field, which indicates the number of periods $N_{gap}$ by which the feedback resource selected for use is spaced from the first available feedback resource. Here, the first available feedback resource is, for example, the feedback resource PSFCH in a time slot n+a determined based on the time slot n for the PSSCH carrying data in the resource pool and the feedback delay K, in a manner as described above with reference to FIG. 2. "a" is the smallest natural number that is greater than or equal to the feedback delay parameter K, provided that there is a periodic feedback resource (PSFCH) in the time slot n+a. When the feedback delay parameter K is fixed, the time domain resource for the PSFCH corresponding to PSSCH is actually determined by the period of the PSFCH.

The interval period indication field of the indication information described above may be, for example, a bit sequence with a fixed length. For example, the indication information of a bit sequence with a length of 4 indicates that the number of periods $N_{gap}$ of the feedback resources by which the feedback resource selected for use is spaced from the first available feedback resource may be 0 to 15, which means a maximum of 15 feedback periods N may be skipped.

In the case that the control information for the first data transmitted by the transceiver unit 810 includes the indication information, such as the interval period indication field, the receiving end user equipment may determine the feedback resource for the first data based on the control information for the first data. For example, the receiving end user equipment may select the PSFCH to be used from the periodic PSFCH in the preconfigured resource pool, at least partially based on the indication information included in the control information such as SCI. When the indication information indicates the number of periods $N_{gap}$ of the feedback resource between the feedback resource selected for use and the first available feedback resource for example, through the interval period indication field, the receiving end user equipment may delay the time slot n+a for the first available feedback resource by the number of time slots $N_{gap}*N$ specified by the number of periods $N_{gap}$, to determine to use the PSFCH in the time slot $n+a+N_{gap}*N$.

In this embodiment, the indication information of the control information generated by the generation unit 820 may not involve the indication on the frequency domain resource of the feedback resource. Therefore, the receiving end user equipment may determine the frequency domain resource of the used PSFCH based on the time domain location of the determined feedback resource (the time slot where the PSFCH is present) and the frequency domain resource for the PSSCH carrying the data (such as the PSSCH subchannel where the PSSCH is present). For example, the receiving end user equipment, after determining the time slot $n+a+N_{gap}*N$ where the feedback resource for the PSSCH, i.e., the PSFCH resource, is present, may determine a PSFCH resource corresponding to the PSSCH subchannel (i.e., determine the frequency domain resource for the PSFCH), based on the configuration information for the resource pool, from the candidate PSFCH resources corresponding to the time slot, and transmit the feedback information using the PSFCH resource.

The receiving unit 810 may receive, from the receiving end user equipment, the feedback information, such as ACK/NACK information that represents positive or negative respectively, transmitted by the feedback resource determined by the receiving end user equipment for example based on the control information for the first data in the above manner described above. As an example, the feedback information received by the receiving unit 810 may be 1-bit information fed back through a cyclic displacement sequence.

As an example, the electronic device 800 may, for example, determine the feedback resource determined by the receiving end user equipment in a manner corresponding to the receiving end user equipment, through a determination unit not shown, so that the receiving unit 810 may receive the feedback information transmitted by the receiving end user equipment using the aforementioned feedback resource. For example, the determination unit of the electronic device 800 that is not shown may have the same or corresponding functions as the determination unit 420 of the electronic device 400 described in the "Configuration example of the first embodiment" section described above, and/or the function (or corresponding function) of determining the feedback resource possessed by the receiving end user equipment described below, which will be not repeated here.

By using the electronic device 800 of this embodiment, dynamic indication information may be included in the control information for the data, so that the receiving end user equipment can transmit the feedback information in a relatively flexible manner using the periodic feedback resource. Therefore, the problem of mismatch between the period of preconfigured feedback resource and the data delay requirements in actual application can be solved.

In a preferred embodiment, the transceiver unit 810 of the electronic device 800 may be further configured to transmit one or more second data and control information for the second data through a side link. The control information includes indicator information for indicating the selection, for use, of the periodic feedback resource. The indication information for the second data and the indication information for the first data indicate to select and use the feedback resources in the same period.

Based on such control information (the indication information included in the control information), the receiving end user equipment may transmit the feedback information for the first data and the feedback information for the second data using the feedback resources in the same period.

In this way, in this preferred embodiment, the feedback information for the first data and the feedback information for the second data are transmitted by the receiving end user equipment using the feedback resources in the same period, thereby reducing the number of switches between the sender and receiver in the side link communication. An example scenario for the selection, for use, of the periodic PSFCH using this preferred embodiment may be the example scenario described above in the configuration example section of the electronic device 400 with reference to FIG. 5, which will not be repeated here.

In a further preferred embodiment, the control information for each data generated by the generation unit 820 of the electronic device 800 may include the ID of the electronic device 800 itself, for the receiving end user equipment to determine the frequency domain resource of the feedback resource for the data based on the ID of the transmitting end electronic device 800 and the ID of the receiving end user equipment.

Correspondingly to the basic example of this preferred embodiment, the receiving end user equipment, after determining the time slot where the feedback resource for the PSSCH carrying data, i.e. the PSFCH resource, is present, may determine multiple PSFCH resources corresponding to the subchannels of the PSSCH based on the configuration information for the resource pool, from the candidate PSFCH resources corresponding to the time slot, and further calculate the remainder of the total number of these PSFCH resources using the sum of the ID of the electronic device 800 in the control information received from the electronic device 800 and the ID of the receiving user equipment to select the PSFCH resource with an index corresponding to the remainder (i.e., determine the frequency domain resource of the feedback resource). The electronic device 800 may receive the feedback information transmitted using the aforementioned feedback resource from the receiving end user equipment through the transceiver unit thereof.

According to an example of this preferred embodiment, for the first data, the second data, and their respective control information transmitted by the electronic device 800 to the receiving end user equipment through a side link, if the indication information of the control information for both the first data and the second data indicates to select and use the feedback resources in the same period, the receiving end user equipment may determine the feedback resources with the different frequency domain resources or the same frequency domain resource for the first data and the second data, and the electronic device 800 may receive from the user equipment the feedback information transmitted using the aforementioned feedback resource through the transceiver unit thereof. Here, the first data and the second data transmitted by the electronic device 800 may be carried on different PSSCHs, separately.

Firstly, the first case is considered, which is an example case where the receiving end user equipment determines the feedback resources with different frequency domain resources for the first and the second data (carried on different PSSCHs) from the electronic device 800 that select to use the feedback resources in the same period. In this example case, since the first data and the second data are separately carried on different PSSCHs (for example, corresponding to different subchannels of the PSSCH) of the same transmitting end UE (i.e. the electronic device 800), the feedback resources determined by the receiving end user equipment for itself in a manner corresponding to the basic example of this preferred embodiment are different (i.e., the feedback resources with the same time domain resources and different frequency domain resources). The electronic device 800 may receive from the receiving end user equipment the feedback information transmitted using the aforementioned feedback resources through the transceiver unit thereof.

Next, the case of the second variant example is consider, which is an example case, where the receiving end user equipment determines the feedback resources with the same frequency domain resources for the first data and the second data (carried on different PSSCHs) from the electronic device 800 that select to use the feedback resources in the same period.

In this variant example, in a preferred implementation, the receiving end user equipment, after determining the feedback resources (such as the feedback resources in a given period/time slot determined based on the interval period indication field in the indication information) in the corresponding period for the current data, may further determine whether the data is the first data of the electronic device 800 transmitting the data that uses the feedback resource in the corresponding period. For example, the receiving end user equipment may set and maintain, for the period $Period_i$ (or time slot $m_i$) of each determined feedback resource, a timer $Timer_{i,j}$ with respect to data from the electronic device 800, which is considered by the receiving end as the transmitting end UEj, to achieve the determination of the "first data" mentioned above, where i is a non negative integer representing the period (or time slot) number of the determined feedback resource, j is a non negative integer representing the UE number. The receiving end user equipment sets an initial value of the timer $Timer_{i,j}$ to 0, increments the value of the timer $Timer_{i,j}$ by 1 for updating each time when the feedback resource in the period $Period_i$ (or time slot $m_i$) is determined for the data from the electronic device 800 as the transmitting end UEj, and determine the frequency domain resource of the feedback resource for the current data in a corresponding manner based on whether the updated value of the $Timer_{i,j}$ is equal to 1 or greater than 1.

More specifically, on the one hand, when the value of the timer $Timer_{i,j}$ is 1, indicating that the current data is the first data of the electronic device 800, as the transmitting end UEj transmitting the data, that uses the feedback resource in the corresponding period $Period_i$ (or time slot $m_i$), the receiving end user equipment may, for example, determine, in a similar manner to the basic example or the first case mentioned above, multiple PSFCH resources corresponding to the subchannels of the PSSCH carrying the data based on the configuration information for the resource pool, from the candidate PSFCH resources in the period $Period_i$ (or time slot $m_i$) where the feedback resource of the data, i.e., PSFCH resource, is present, and further determine the PSFCH resource to be used based on the ID of the electronic device 800 as the transmitting end UEj and the ID of the receiving end user equipment. On the other hand, when the value of the timer $Timer_{i,j}$ is greater than 1, indicating that the current data is not the first data of the electronic device 800 as the transmitting end UEj transmitting the data that uses the feedback resource in the corresponding period $Period_i$, the receiving end user equipment may continue to use the feedback resource determined in the aforementioned manner for the first data.

Alternatively, in an alternative implementation of the present variant example, in addition to the interval period indication field $N_{gap}$ described earlier, the indication information of the control information for each data generated by the generation unit 810 of the electronic device 800 may include additional indication flag, such as 1 bit, which is used to indicate whether the data is the first data of the electronic device 800 that selects to use the feedback resource (the feedback resource in the given period/time slot $n+a+N_{gap}*N$ specified based on the interval period indication field $N_{gap}$ in the indication information) in corresponding period $Period_i$ (or time slot $m_i$).

When receiving the control information of the indication information for the current data with the indication field mentioned above, the receiving end user equipment may determine feedback resources in a corresponding manner based on the indication field. On the one hand, when the indication flag is, for example, 1, indicating that the current data is the first data of the electronic device 800 transmitting the data that uses the feedback resource in the corresponding period $Period_i$ (or time slot $m_i$), the receiving end user equipment may, for example, determine, in a similar manner to the basic example or the first case mentioned above, multiple PSFCH resources corresponding to the subchannels of the PSSCH carrying the data based on the configuration information for the resource pool, from the candidate PSFCH resources in the period $Period_i$ (or time slot $m_i$) where the feedback resource for the data, i.e., the PSFCH resource, is present, and further determine the PSFCH resources to be used based on the ID of the electronic device 800 and the ID of the receiving end user equipment. On the other hand, when the indication flag, is, for example, 0, indicating that the current data is not the first data of the electronic device 800 transmitting the data that uses the feedback resource in the corresponding period $Period_i$ (or time slot $m_i$), the receiving end user equipment may continue to use the feedback resource determined in the aforementioned manner for the first data.

The electronic device 800 may receive from the receiving end user equipment the feedback information transmitted using the feedback resource (the feedback resource with the same frequency domain resource) determined in the above manner by the receiving end user equipment. As mentioned earlier, regardless of how the receiving end user equipment determines the feedback resource, the electronic device 800 as the transmitting end user equipment may, for example, determine the feedback resource determined by the receiving end user equipment in a corresponding manner through the determination unit not shown. For example, in the preferred implementation of the above variant example, in the case where the receiving end user equipment sets and maintains, for period $Period_i$ (or time slot $m_i$) for each determined feedback resource, a timer $Timer_{i,j}$ with respect to data from the electronic device 800, which is considered by the receiving end as the transmitting end UEj, the electronic device 800 may similarly set and maintain, for the period $Period_i$ (or time slot $m_i$) of each determined feedback resource, the timer $Timer_{i,d}$ (where d is a non negative integer representing the UE number), with respect to the receiving end user equipment UEd, and increment a value of the timer $Timer_{i,d}$ by 1 for updating each time when the feedback resource in the period $Period_i$ (or time slot $m_i$) is determined for the data to be transmitted to the receiving end UEd, and determine in a corresponding manner the frequency domain resource of the feedback resource for the current data based on whether the updated value of the $Timer_{i,d}$ is equal to 1 or greater than 1.

In addition, in the case of the above variation example, due to the determination of the same PSFCH resource (PSSCH in the same period/time slot and with the same frequency domain resource) for the first data and the second data, it is not possible to use the feedback information in the form of cyclic displacement sequence that can only carry 1 bit in the conventional technology. Therefore, in an example of this preferred embodiment, the feedback information that the electronic device 800 receives from the receiving end user equipment is the feedback information using a feedback codebook (such as a HARQ codebook on a Uu port). This feedback information can carry information of multiple bits, thereby achieving code division multiplexing of the feedback information for multiple data transmitted by the electronic device 800.

In the above description, the case where the periodic feedback resource has a fixed feedback period is described as an example. In a preferred embodiment, the configuration information for the periodic feedback resource obtained in advance from a network side device by the electronic device 800, for example, through the transceiver unit 810 may specify one or more candidate periods for the periodic feedback resource. In this case, before the transmitting end electronic device 800 and the receiving end user equipment perform data transmission on the side link, both of them may, for example, communicate in advance to determine the period of the currently used periodic feedback resource. For example, the electronic device 800 may transmit the control information specifying the period (feedback period) of the periodic feedback resource selected for use to the receiving end user equipment through the transceiver unit 810, so that the receiving end user equipment may perform subsequent process based on the period of the feedback resource specified by the control information. Alternatively, the electronic device 800 may additionally add a feedback period field for specifying the currently used feedback period in the control information for each data during the data transmission on the side link, so that the receiving end user equipment may perform corresponding process based on the period of the feedback resource specified in the field.

Optionally, the electronic device 800 may obtain multiple sets of configuration information in advance from network side device through the transceiver unit 810, where each set of configuration information is associated with a corresponding data service and specifies one or more candidate periods. As an example, a set of configuration information associated with Ultra Reliable and Low Latency Communications (URLLC) service that is sensitive to latency may specify a set of shorter candidate feedback periods $\{1, 2, 4\}$. A set of configuration information associated with Enhanced Mobile Broadband (eMBB) service that is relatively insensitive to latency may specify a set of longer candidate feedback periods $\{8,16\}$.

In this case, before or during the transmitting end electronic device 800 and the receiving end user equipment carry out the data transmission of the given data service on the side link, the electronic device 800 may transmit to the receiving end user equipment the control information specifying the feedback period selected for use associated with the current data service through the transceiver unit 810, so that the receiving end user equipment may perform corresponding process based on the period of the feedback resource specified by the control information.

4. CONFIGURATION EXAMPLE OF THIRD EMBODIMENT

Figure 9:
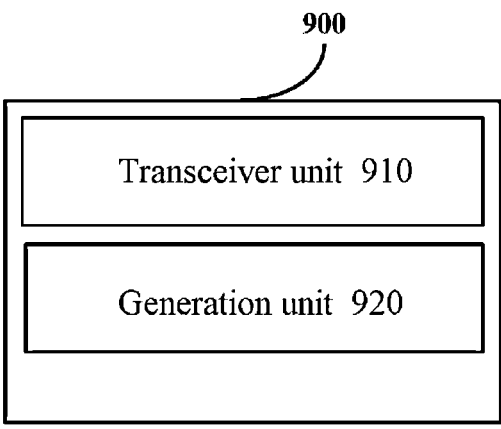
FIG. 9 is a block diagram showing a configuration example of an electronic device according to a third embodiment of the present disclosure (capable of providing configuration information for a resource pool for the electronic device according to an embodiment of the present disclosure)

FIG. 9 is a block diagram showing a configuration example of an electronic device of a third embodiment of the present disclosure, which can be used as a network side device providing configuration information for the resource pools for the electronic device of the first and second embodiments. For various details not described here, reference is made to the configuration and processing examples of the electronic devices 400 and 800 described above.

As shown in FIG. 9, an electronic device 900 may include a transceiver unit 910 and a generation unit 920.

Here, each unit of the electronic device 900 may be included in a processing circuitry. It should be noted that, the electronic device 900 may include one or more processing circuitry. Further, the processing circuitry may include various discrete functional units for performing various functions and/or operations. It should be noted that these functional units may be physical entities or logical entities, and units with different names may be implemented by a same physical entity.

The electronic device 900 shown in FIG. 9 may be a network side device capable of providing configuration information for a resource pool, such as a base station device. According to this embodiment, the generation unit 920 of the electronic device 900 may be configured to generate configuration information related to PSSCH, PSCCH, PSFCH, etc. in the resource pool. The transceiver unit 910 may be configured to provide the configuration information for the resource pool generated by the generation unit 920 to user equipment (such as the electronic devices 400, 800 of the first and second embodiments). For example, the configuration information for the resource pool generated by the generation unit 920 may include relevant parameters regarding a feedback period N of PSFCH to specify a period of the PSFCH. In addition, the configuration information for the resource pool may also include feedback delay parameter K regarding the PSFCH. In addition, the configuration information for the resource pool may also include relevant parameters and/or predetermined rules for determining frequency domain correspondence between the PSSCH resource and the associated PSFCH resource.

5. EXAMPLE OF INFORMATION INTERACTION FLOW

Figure 10:
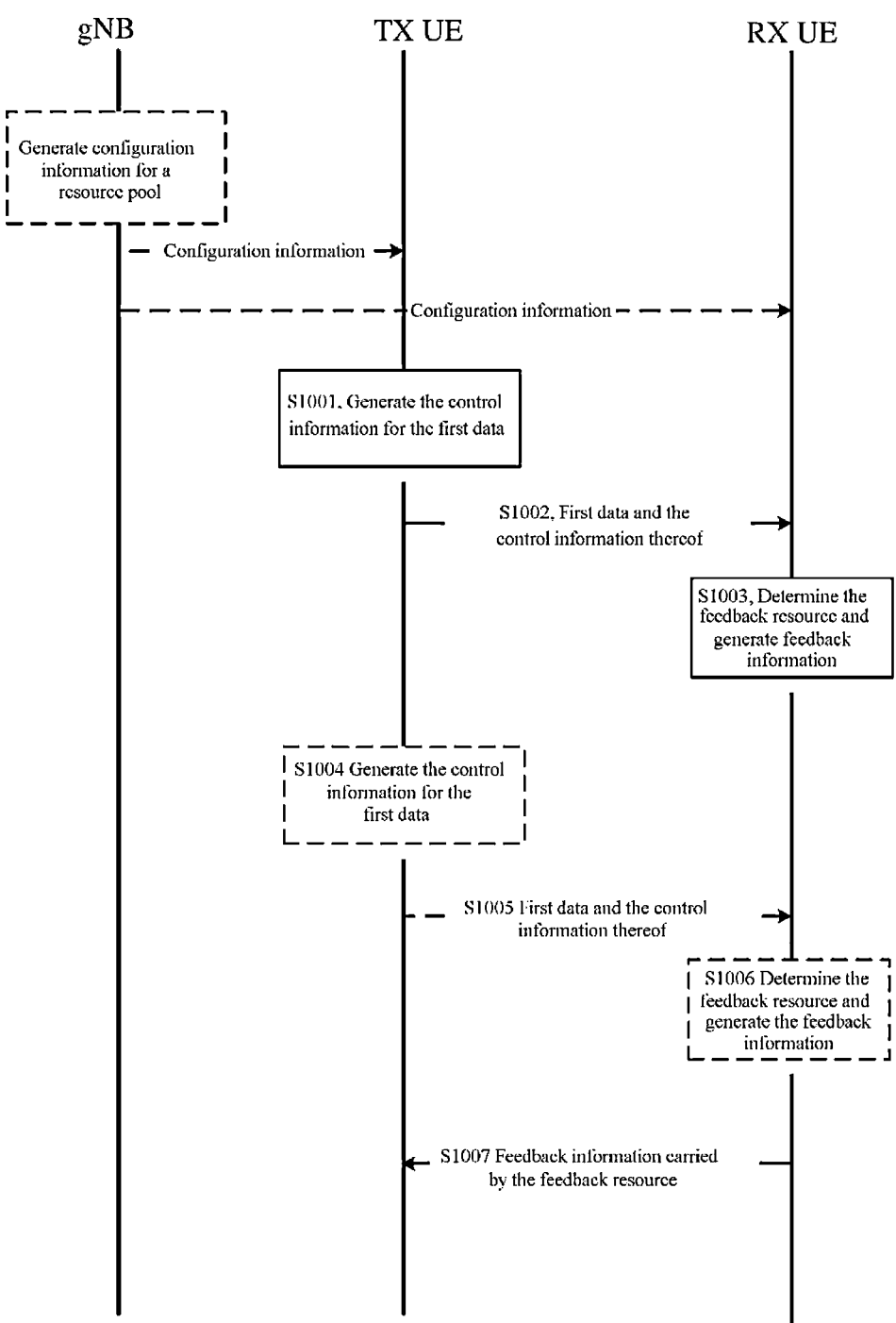
FIG. 10 is a schematic diagram showing exemplary signaling interaction between electronic devices according to an embodiment of the present disclosure.

FIG. 10 is a flowchart showing an example of an information interaction flow according to an embodiment of the present disclosure.

In this example, information exchange among a network side device gNB, a transmitting end user equipment TX UE, and a receiving end user equipment RX UE is shown. The network side device gNB has, for example, functions of the electronic device 900 described with reference to FIG. 9, the transmitting end user equipment TX UE has, for example, functions of the electronic device 800 described with reference to FIG. 8, and the receiving end user equipment RX UE has, for example, functions of the electronic device 400 described with reference to FIG. 4.

As shown in FIG. 10, the TX UE and the RX UE obtain the configuration information for the resource pool in advance from the gNB, which includes the configuration information for the periodic feedback resource such as PSFCH. The TX UE generates control information for the first data to be transmitted through the side link in step S1001, where the control information includes indication information for indicating the selection, for use, of a periodic feedback resource such as PSFCH. The TX UE transmits the first data (such as carried on PSSCH) and the control information for the first data (such as carried in SCI-1 on PSCCH or SCI-2 on PSSCH) to the RX UE in step

S1001. In step S1003, the RX UE determines the feedback resource for the first data based on the control information for the first data received in step S1002.

Subsequently, in optional steps S1004 to S1005, the TX UE may generate control information for the second data to be transmitted through the side link in a similar manner to steps S1001 to S1002, and transmit the second data (such as carried on PSSCH) and the control information for the second data (such as carried in SCI-1 on PSSCH or SCI-2 on PSSCH) to the RX UE. In this example, indication information in the control information for the second data and indication information in the control information for the first data indicate to select and use the feedback resources in the same period. In an optional step S1006, the RX UE determines the feedback resource for the second data based on the control information for the second data received in step S1005, that is, determines for the second data the feedback resource in the same period as the feedback resource for the first data.

Next, in step S1007, the RX UE transmits feedback information for the first data to the TX UE based on the feedback resource determined in step S1003, and optionally transmits simultaneously feedback information for the second data to the TX UE based on the feedback resource determined in step S1006 (i.e., the feedback resource in the same period as the feedback resource for the first data).

6. METHOD EMBODIMENT

Figure 11:
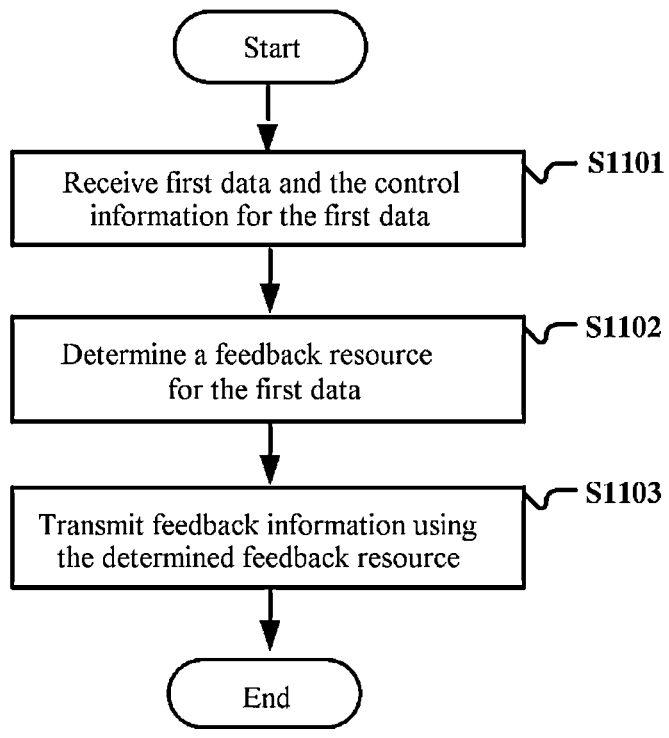
FIG. 11 is a flowchart showing an example of a method for wireless communications according to a first embodiment of the present disclosure.

FIG. 11 is a flowchart illustrating a procedure example of a method for wireless communications according to a first embodiment of the present disclosure. The method shown in FIG. 11 may be performed for example by the electronic device 400 described earlier with reference to FIG. 4.

As shown in FIG. 11, in step S1101, first data and control information for the first data may be received at a receiving end electronic device through a side link. The control information includes indication information for indicating the selection, for use, of a periodic feedback resource. Next, in step S1102, the feedback resource is determined for the first data based on the control information for the first data. Next, in step S1103, feedback information for the first data is transmitted using the determined feedback resource.

As an example, the indication information may indicate the number of periods of feedback resources by which the feedback resource selected for use is spaced from the first available feedback resource.

Although not shown in the figure, the method for wireless communications according to this embodiment may alternatively include: receiving second data and control information for the second data through a side link, where the control information includes the indication information for indicating the selection, for use, of a periodic feedback resource, and the indication information for the second data and the indication information for the first data indicate to select and use the feedback resources in the same period.

Optionally, the control information for each data received in step S1101 also includes an ID of the user equipment transmitting the data. Correspondingly, in step S1102, the frequency domain resource of the feedback resource for each data may be determined based on the ID of the user equipment transmitting the data and the ID of the electronic device.

In an example, the first data, the second data, and their respective control information are received from the same user equipment (for example, carried on different PSSCHs, separately), and the feedback resources with the same frequency domain resource may be determined for the first data and the second data.

In another example, the first data and the control information thereof mentioned above and the second data and the control information thereof mentioned above are received from the first user equipment and the second user equipment, respectively, and the feedback resources with different frequency domain resources may be determined for the first data and the second data.

Although not shown in the figure, the method for wireless communications according to this embodiment may optionally include: determining whether the transiting of the feedback information for each data exceeds the transmission ability of the electronic device, before the feedback information for each data is transmitted using the determined feedback resource, and transmitting preferentially the feedback information for data from the same user equipment and/or transmitting preferentially the feedback information for data carried by the PSSCH with high priority when it is determined the transmission ability of the electronic device is exceeded.

Although not shown in the figure, the method for wireless communications according to this embodiment may optionally include: obtaining configuration information for the periodic feedback resource in advance, where the configuration information specifies one or more candidate periods for the periodic feedback resource. For example, multiple sets of configuration information may be obtained in advance, where each set of configuration information is associated with a corresponding data service and specifies one or more candidate periods.

According to embodiments of the present disclosure, the execution body performing the method above may be the electronic device 400 according to the first embodiment of the present disclosure. Therefore, various aspects of the embodiment about the electronic device 400 are applicable to the method.

Figure 12:
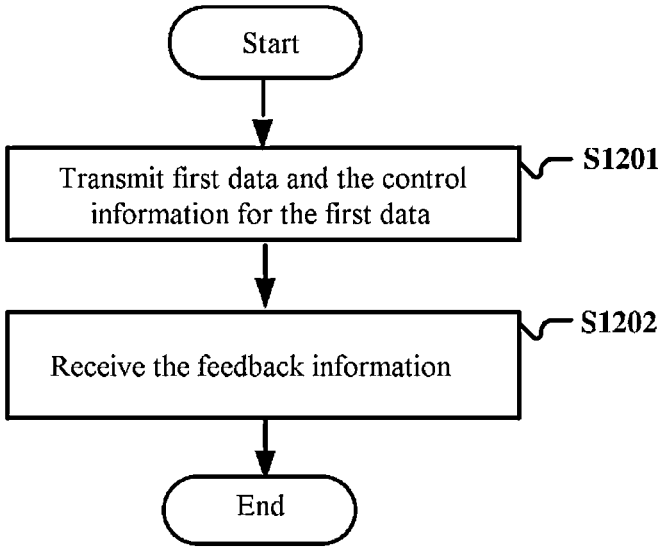
FIG. 12 is a flowchart showing an example of a method for wireless communications according to a second embodiment of the present disclosure.

FIG. 12 is a flowchart illustrating a procedure example of a method for wireless communications according to a second embodiment of the present disclosure. The method shown in FIG. 12 may be performed for example by the electronic device 800 described earlier with reference to FIG. 8.

As shown in FIG. 12, in step S1201, for example, first data and control information for the first data are transmitted to a user equipment at a transmitting end electronic device through a side link. The control information includes indication information for indicating the selection, for use, of a periodic feedback resource, and is used by the user equipment to determine a feedback resource.

Next, in step S1202, feedback information for the first data transmitted using the determined feedback resource is received from the user equipment.

As an example, the indication information may indicate the number of periods of feedback resources by which the feedback resource selected for use is spaced from the first available feedback resource.

Although not shown in the figure, the method for wireless communications according to this embodiment may optionally include: transmitting second data and control information for the second data to a user equipment through a side link, where the control information includes indication information for indicating the selection, for use, of the periodic feedback resource, and the indication information for the second data and the indication information for the first data indicate to select and use the feedback resources in the same period.

Optionally, the control information for each data transmitted in step S1201 also includes an ID of the electronic device, so that the receiving end user equipment may determine a frequency domain resource of the feedback resource for the data based on the ID of the user equipment and the ID of the electronic device.

In an example, the feedback information for the first data and the feedback information for the second data transmitted using the feedback resources with the same frequency domain resource (the first data and the second data may for example be carried on different PSSCHs, separately) may be received from the user equipment.

Although not shown in the figure, the method for wireless communications according to this embodiment may optionally include: obtaining configuration information for the periodic feedback resource in advance, where the configuration information specifies one or more candidate periods for the periodic feedback resource. For example, multiple sets of configuration information may be obtained in advance, where each set of configuration information is associated with a corresponding data service and specifies one or more candidate periods.

According to embodiments of the present disclosure, the execution body performing the method may be the electronic device 800 according to the second embodiments of the present disclosure. Therefore, various aspects of the embodiments about the electronic device 800 are applicable to the method.

7. APPLICATION EXAMPLE

The technology of the present disclosure may be applied to various products.

For example, the electronic device 900 on the network side may be implemented as base station equipment in any type, such as a macro eNB or a small eNB, and may be implemented as a gNB (a base station in a 5G system) in any type. The small eNB may be an eNB covering a cell smaller than a macro cell, such as a pico eNB, a micro eNB, or a home (femto) eNB. Alternatively, the base station may also be implemented as any other type of base stations, such as a NodeB and a base transceiver station (BTS). The base station may include a body (also referred to as a base station equipment) configured to control wireless communications; and one or more remote radio heads (RRHs) arranged in a different position from the body.

In addition, the electronic device 900 on the network side may also be implemented as any type of TRP. The TRP may have transmitting and receiving functions. For example, the TRP may receive information from a user equipment and a base station equipment, and may send information to the user equipment and the base station equipment. In a typical example, the TRP may provide services for the user equipment and is controlled by the base station equipment. Further, the TRP may have a structure similar to that of the base station equipment, or may only have a structure related to transmitting and receiving information in the base station equipment.

The electronic devices 400, 800, as the user equipment (on terminal equipment side), may be implemented as various user equipment. The user equipment may be implemented as a mobile terminal (such as a smart phone, a tablet personal computer (PC), a notebook PC, a portable game terminal, a portable/dongle mobile router, and a digital camera device), or an in-vehicle terminal (such as a car navigation apparatus). The user equipment may also be implemented as a terminal performing machine to machine (M2M) communication (also referred to as a machine-type communication (MTC) terminal). In addition, the user equipment may further be a wireless communication module (such as an integrated circuitry module including one wafer) mounted on each of the above user equipment.

Application Example Regarding Base Station

First Application Example

Figure 13:
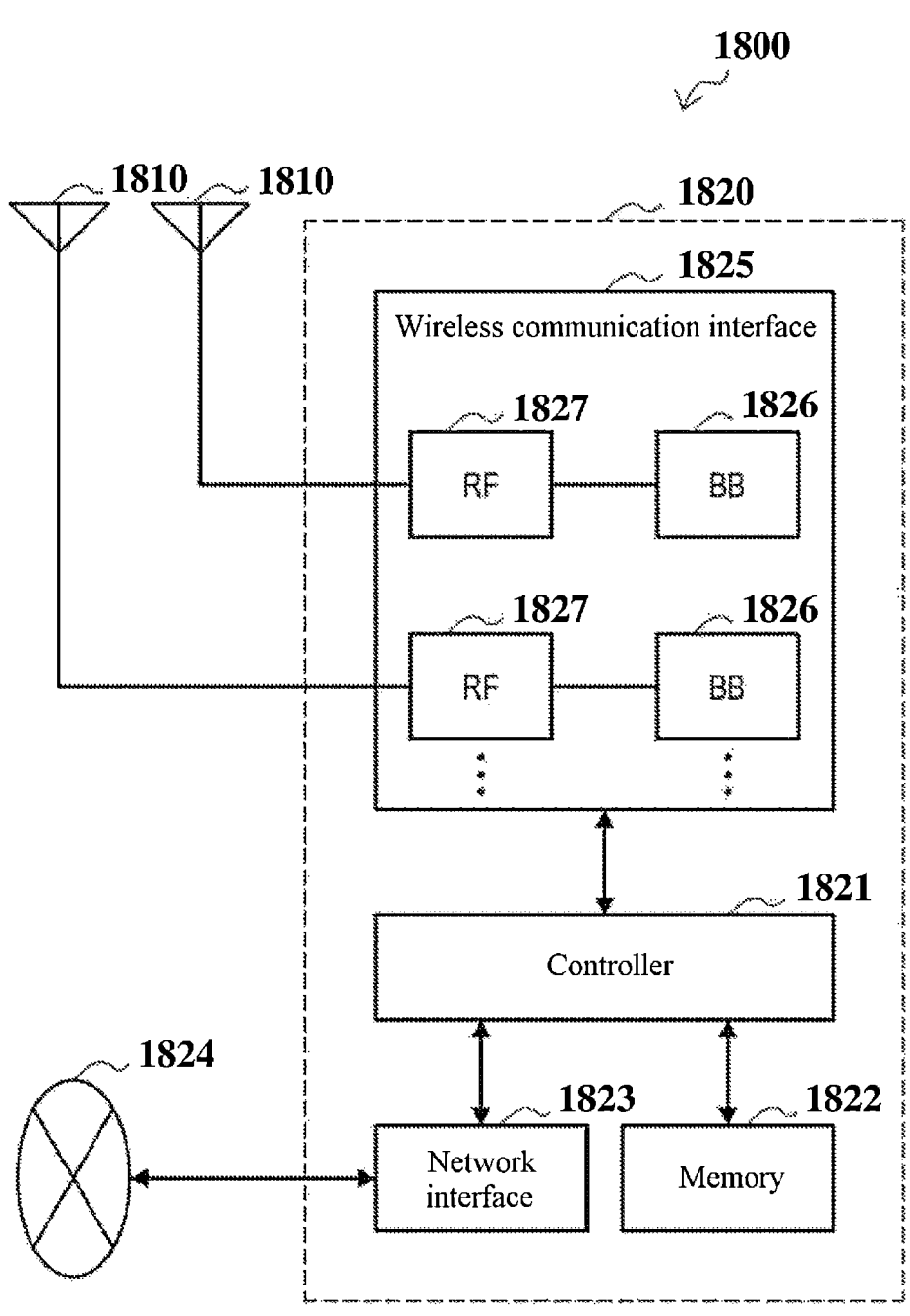
FIG. 13 is a block diagram showing a first example of a schematic configuration of an eNB to which the technology of the present disclosure may be applied.

FIG. 13 is a block diagram showing a first example of a schematic configuration of an eNB in which the technique of the disclosure can be applied. The eNB 1800 includes a single or multiple antennas 1810 and a base station equipment 1820. The base station equipment 1820 and each antenna 1810 may be connected with each other via RF cable.

Each of the antennas 1810 includes one or more antenna elements (such as multiple antenna elements included in a multiple-input multiple-output (MIMO) antenna), and are used for transmitting and receiving a wireless signal by the base station equipment 1820. The eNB 1800 may include the multiple antennas 1810, as illustrated in FIG. 13. For example, the multiple antennas 1810 may be compatible with multiple frequency bands used by the eNB 1800. Although FIG. 13 illustrates an example in which the eNB 1800 includes multiple antennas 1810, the eNB 1800 may also include a single antenna 1810.

The base station equipment 1820 includes a controller 1821, a memory 1822, a network interface 1823, and a wireless communication interface 1825.

The controller 1821 may be, for example, a CPU or a DSP and operate various functions of higher layers of the base station equipment 1820. For example, the controller 1821 generates a data packet based on data in a signal processed by the wireless communication interface 1825, and transmits the generated packet via the network interface 1823. The controller 1821 may bundle data from multiple baseband processors to generate a bundled packet and transmit the generated bundled packet. The controller 1821 may have logic functions for performing the following control: wireless resource control, radio carrying control, mobility management, admission control and schedule. The control may be performed in corporation with a nearby eNB or core network node. The memory 1822 includes an RAM and an ROM, and stores a program executed by the controller 1821 and various types of control data (such as a terminal list, transmission power data and scheduling data).

The network interface 1823 is configured to connect the base station equipment 1820 to a communication interface of the core network 1824. The controller 1821 may communicate with a core network node or another eNB via the network interface 1823. In this case, the eNB 1800 and the core network node or another eNB may be connected to each other via a logic interface (such as an SI interface and an X2 interface). The network interface 1823 may be a wired communication interface or a wireless communication interface for a wireless backhaul line. If the network interface 1823 is a wireless communication interface, the network interface 1823 may use a higher frequency band for radio communication as compared with the frequency band used by the wireless communication interface 1825.

The wireless communication interface 1825 supports any cellular communication scheme (such as Long Term Evolution (LTE) and LTE-Advanced), and provides wireless connection to a terminal located in a cell of the eNB 1800 via the antenna 1810. The wireless communication interface 1825 may generally include a base band (BB) processor 1826 and an RF circuit 1827. The BB processor 1826 may perform, for example, encoding/decoding, modulating/demodulating, and multiplexing/de-multiplexing, and perform various types of signal processing of layers (such as LI, medium access control (MAC), radio link control (RLC), and packet data convergence protocol (PDCP)). Instead of the controller 1821, the BB processor 1826 may have a part or all of the above-mentioned logic functions. The BB processor 1826 may be a memory storing communication control programs, or a module including a processor which is configured to execute the programs and a related circuit. Update of the programs may change the function of the BB processor 1826. The module may be a card or a blade inserted into a slot of the base station equipment 1820. Alternatively, the module may be a chip installed on the card or the blade. Meanwhile, the RF circuit 1827 may include for example a mixer, a filter or an amplifier, and transmits and receives a radio signal via the antenna 1810.

The wireless communication interface 1825 may include multiple BB processors 1826, as illustrated in FIG. 13. For example, the multiple BB processors 1826 may be compatible with multiple frequency bands used by the eNB 1800. As shown in FIG. 13, the wireless communication interface 1825 may include multiple RF circuits 1827. For example, the multiple RF circuits 1827 may be compatible with multiple antenna elements. Although FIG. 13 shows the example in which the wireless communication interface 1825 includes the multiple BB processors 1826 and the multiple RF circuits 1827, the wireless communication interface 1825 may also include a single BB processor 1826 or a single RF circuit 1827.

In the eNB 1800 shown in FIG. 13, the transceiver unit 910 in the electronic device 900 described above with reference to FIG. 9 may be implemented through the wireless communication interface 1825 and optional the antenna 1810. The function of the generation unit 920 in electronic device 900 may be achieved through controller 1821. For example, the controller 1821 may achieve the function of the generation unit 920 by executing instructions stored in the memory 1822.

Second Application Example

Figure 14:
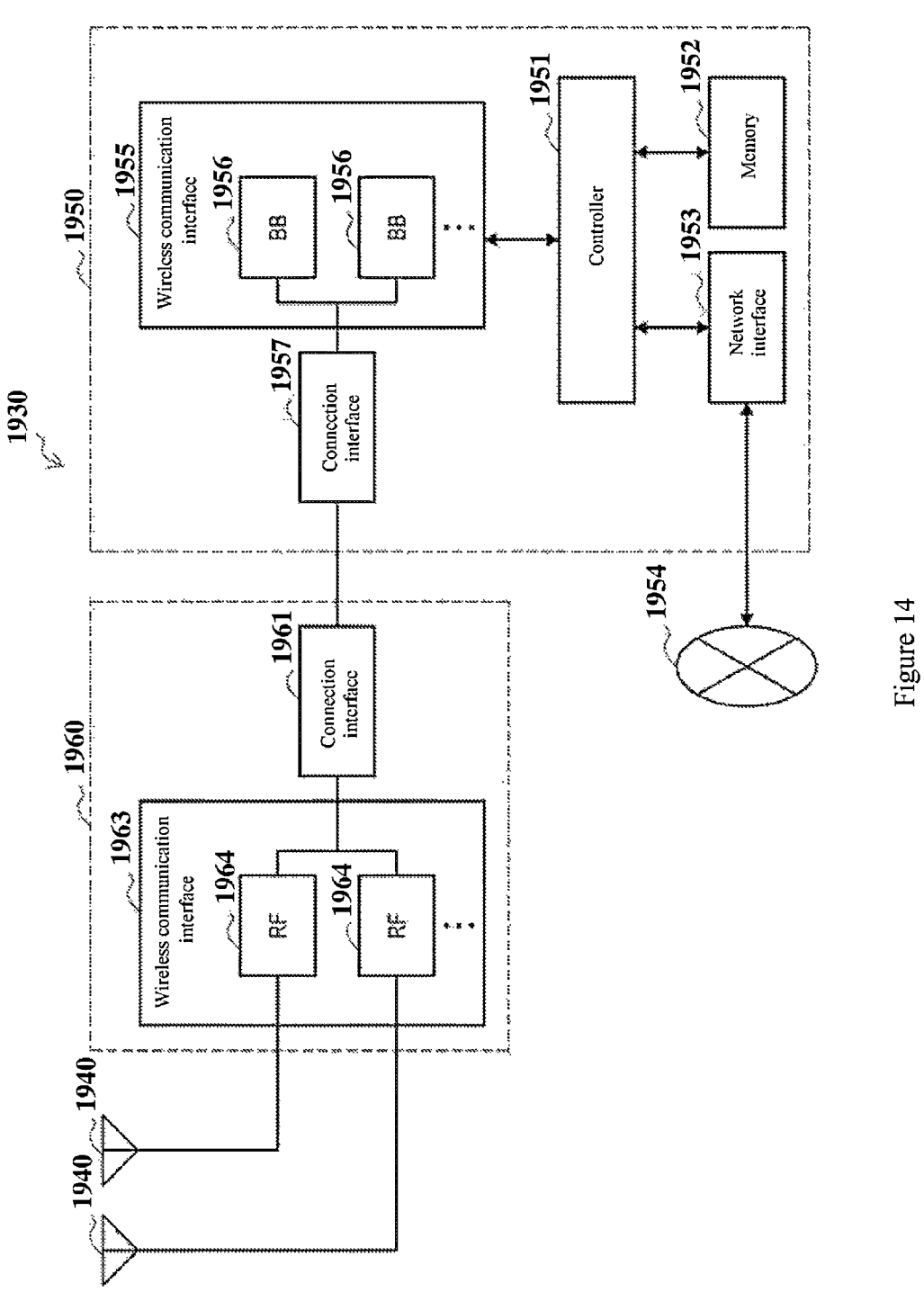
FIG. 14 is a block diagram showing a second example of a schematic configuration of an eNB to which the technology of the present disclosure may be applied.

FIG. 14 is a block diagram showing a second example of a schematic configuration of an eNB to which the technology of the present disclosure can be applied. An eNB 1930 includes one or more antennas 1940, a base station equipment 1950 and an RRH 1960. The RRH 1960 and each antenna 1940 may be connected to each other via an RF cable. The base station equipment 1950 and the RRH 1960 may be connected to each other via a high speed line such as an optical fiber cable.

Each of the antennas 1940 includes a single or multiple antenna elements (such as multiple antenna elements included in an MIMO antenna), and is used for the RRH 1960 to transmit and receive radio signals. As shown in FIG. 14, the eNB 1930 may include multiple antennas 1940. For example, the multiple antennas 1940 may be compatible with multiple frequency bands used by the eNB 1930. Although FIG. 14 illustrates an example in which the eNB 1930 includes multiple antennas 1940, the eNB 1930 may also include a single antenna 1940.

The base station equipment 1950 includes a controller 1951, a memory 1952, a network interface 1953, a wireless communication interface 1955, and a connection interface 1957. The controller 1951, the memory 1952, and the network interface 1953 are the same as the controller 1821, the memory 1822, and the network interface 1823 described with reference to FIG. 13.

The wireless communication interface 1955 supports any cellular communication solution (such as LTE and LTE-advanced), and provides wireless communication with a terminal located in a sector corresponding to the RRH 1960 via the RRH 1960 and the antenna 1940. The wireless communication interface 1955 may typically include a BB processor 1956 for example. The BB processor 1956 is the same as the BB processor 1826 described with reference to FIG. 13, except that the BB processor 1956 is connected to the RF circuitry 1964 of the RRH 1960 via the connection interface 1957. As show in FIG. 14, the wireless communication interface 1955 may include multiple BB processors 1956. For example, the multiple BB processors 1956 may be compatible with the multiple frequency bands used by the eNB 1930. Although FIG. 14 shows an example in which the wireless communication interface 1955 includes multiple BB processors 1956, the wireless communication interface 1955 may include a single BB processor 1956.

The connection interface 1957 is an interface for connecting the base station equipment 1950 (wireless communication interface 1955) to the RRH 1960. The connection interface 1957 may also be a communication module for communication in the above-described high-speed line via which the base station equipment 1950 (wireless communication interface 1955) is connected to the RRH 1960.

The RRH 1960 includes a connection interface 1961 and a wireless communication interface 1963.

The connection interface 1961 is an interface for connecting the RRH 1960 (the wireless communication interface 1963) to the base station equipment 1950. The connection interface 1961 may also be a communication module for the communication in the above high-speed line.

The wireless communication interface 1963 transmits and receives a wireless signal via the antenna 1940. The wireless communication interface 1963 may typically include, for example, the RF circuit 1964. The RF circuit 1964 may include for example frequency mixer, a filter and an amplifier, and transmits and receives a wireless signal via the antenna 1940. The wireless communication interface 1963 may include multiple RF circuits 1964, as illustrated in FIG. 14. For example, the multiple RF circuits 1964 may support multiple antenna elements. Although FIG. 14 shows an example in which the wireless communication interface 1963 includes the multiple RF circuits 1964, the wireless communication interface 1963 may also include a single RF circuit 1964.

In eNB 1930 shown in FIG. 14, the transceiver unit 910 in the electronic device 900 previously described with reference to FIG. 9 may be implemented, for example, through a wireless communication interface 1963 and an optional antenna 1940. The function of the generation unit 920 in the electronic device 900 may be achieved through the controller 1951. For example, controller 1951 may achieve the function of generating unit 920 by executing instructions stored in the memory 1952.

Application Examples of User Equipment

First Application Example

Figure 15:
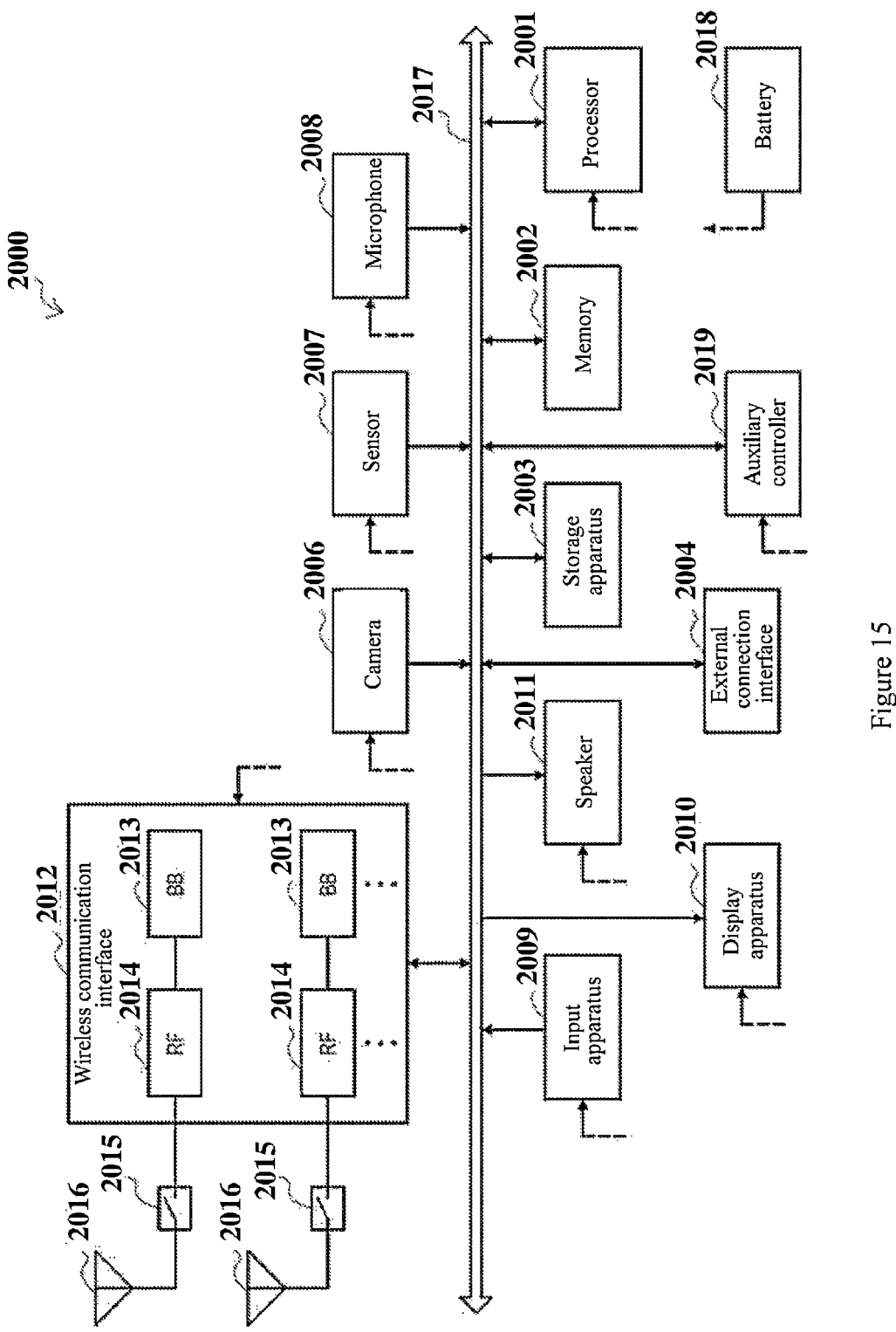
FIG. 15 is a block diagram showing an example of a schematic configuration of a smartphone to which the technology of the present disclosure may be applied.

FIG. 15 is a block diagram illustrating an example of exemplary configuration of a smartphone 2000 to which the technology of the present disclosure can be applied. The smartphone 2000 includes a processor 2001, a memory 2002, a storage apparatus 2003, an external connection interface 2004, a camera 2006, a sensor 2007, a microphone 2008, an input apparatus 2009, a display apparatus 2010, a speaker 2011, a wireless communication interface 2012, one or more antenna switches 2015, one or more antennas 2016, a bus 2017, a battery 2018, and an auxiliary controller 2019.

The processor 2001 may be, for example, a CPU or a system on chip (SoC), and control functions of an application layer and additional layer of the smartphone 2000. The memory 2002 includes RAM and ROM, and stores a program that is executed by the processor 2001, and data. The storage apparatus 2003 may include a storage medium such as a semiconductor memory and a hard disk. The external connection interface 2004 is an interface configured to connect an external apparatus (such as a memory card and a universal serial bus (USB) apparatus) to the smart phone 2000.

The camera 2006 includes an image sensor (such as a Charge Coupled Device (CCD) and a Complementary Metal Oxide Semiconductor (CMOS)) and generates a captured image. The sensor 2007 may include a group of sensors such as a measurement sensor, a gyro sensor, a geomagnetic sensor, and an acceleration sensor. The microphone 2008 converts sounds that are inputted to the smart phone 2000 into audio signals. The input apparatus 2009 includes, for example, a touch sensor configured to detect touch onto a screen of the display apparatus 2010, a keypad, a keyboard, a button, or a switch, and receive an operation or information inputted from a user. The display apparatus 2010 includes a screen (such as a liquid crystal display (LCD) and an organic light-emitting diode (OLED) display), and displays an output image of the smartphone 2000. The speaker 2011 converts audio signals that are outputted from the smart phone 2000 to sounds.

The wireless communication interface 2012 supports any cellular communication scheme (such as LTE and LTE-advanced), and performs wireless communication. The wireless communication interface 2012 may generally include for example a BB processor 2013 and an RF circuit 2014. The BB processor 2013 may perform encoding/decoding, modulating/demodulating and multiplexing/de-multiplexing for example, and perform various types of signal processing for wireless communication. Meanwhile, the RF circuit 2014 may include for example a mixer, a filter and an amplifier, and transmit and receive a wireless signal via the antenna 2016. The wireless communication interface 2012 may be a chip module having the BB processor 2013 and the RF circuit 2014 integrated thereon. As shown in FIG. 15, the wireless communication interface 2012 may include multiple BB processors 2013 and multiple RF circuits 2014. Although FIG. 15 illustrates the example in which the wireless communication interface 2012 includes the multiple BB processors 2013 and the multiple RF circuits 2014, the wireless communication interface 2012 may also include a single BB processor 2013 or a single RF circuit 2014.

Furthermore, in addition to a cellular communication scheme, the wireless communication interface 2012 may support another type of wireless communication scheme such as a short-distance wireless communication scheme, a near field communication scheme, and a wireless local area network (LAN) scheme. In this case, the wireless communication interface 2012 may include the BB processor 2013 and the RF circuit 2014 for each wireless communication scheme.

Each of the antenna switches 2015 switches connection destinations of the antennas 916 among multiple circuits (such as circuits for different wireless communication schemes) included in the wireless communication interface 2012.

Each of the antennas 2016 includes a single or multiple antenna elements (such as multiple antenna elements included in an MIMO antenna), and is used for the wireless communication interface 2012 to transmit and receive radio signals. The smartphone 2000 may include the multiple antennas 2016, as illustrated in FIG. 15. Although FIG. 15 illustrates the example in which the smartphone 2000 includes the multiple antennas 2016, the smartphone 2000 may also include a single antenna 2016.

In addition, the smartphone 2000 may include an antenna 2016 for each wireless communication scheme. In this case, the antenna switch 2015 may be omitted from the configuration of the smartphone 2000.

The bus 2017 connects the processor 2001, the memory 2002, the storage apparatus 2003, the external connection interface 2004, the camera 2006, the sensor 2007, the microphone 2008, the input apparatus 2009, the display apparatus 2010, the speaker 2011, the wireless communication interface 2012, and the auxiliary controller 2019 to each other. The battery 2018 supplies power to blocks of the smart phone 2000 shown in FIG. 15 via feeder lines, which are partially shown as dashed lines in the figure. The auxiliary controller 2019 operates a minimum necessary function of the smart phone 2000, for example, in a sleep mode.

In the smart phone 2000 shown in FIG. 15, the transceiver units 410 and 810 in the electronic devices 400 and 800 previously described with reference to FIGS. 4 and 8 may be implemented through wireless communication interface 2012 and optional antenna 2016. The functions of the determination unit 420 and generation unit 430 of the electronic device 400, and the generation unit 820 of the electronic device 800, may be implemented by the processor 2001 or the auxiliary controller 2019. For example, processor 2001 or the auxiliary controller 2019 may achieve the functions of the determination unit 420 and the generation unit 430 by executing instructions stored in the memory 2002 or the storage apparatus 2003. Similarly, the processor 2001 or the auxiliary controller 2019 may achieve the function of the generation unit 820 by executing instructions stored in the memory 2002 or the storage apparatus 2003.

Second Application Example

Figure 16:
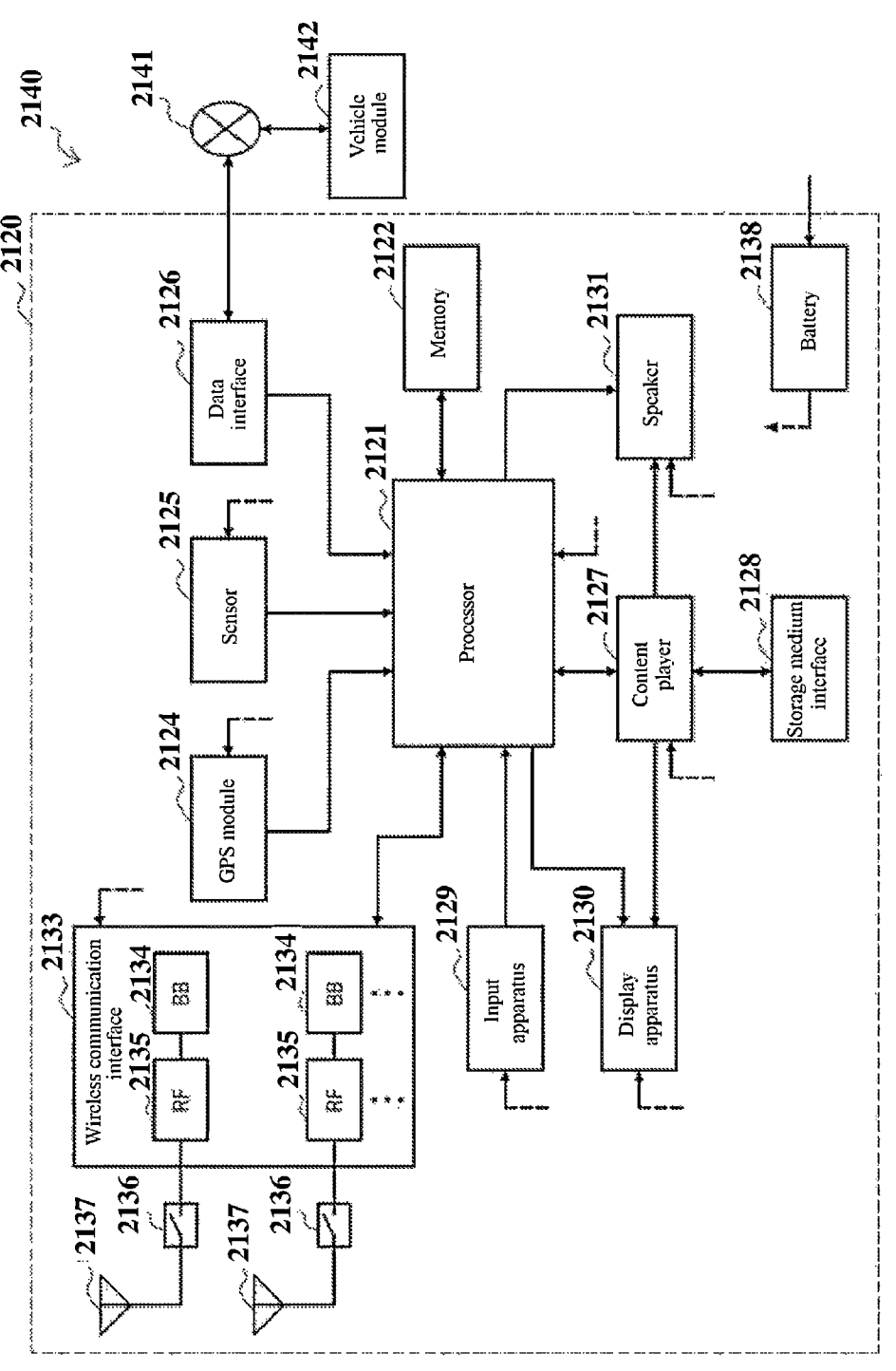
FIG. 16 is a block diagram showing an example of a schematic configuration of a car navigation device to which the technology of the present disclosure may be applied.

FIG. 16 is a block diagram showing an example of a schematic configuration of a car navigation device 2120 to which the technology according to the present disclosure can be applied. The car navigation device 2120 includes a processor 2121, a memory 2122, a global positioning system (GPS) module 2124, a sensor 2125, a data interface 2126, a content player 2127, a storage medium interface 2128, an input apparatus 2129, a display apparatus 2130, a speaker 2131, a wireless communication interface 2133, one or more antenna switches 2136, one or more antennas 2137, and a battery 2138

The processor 2121 may be, for example, a CPU or a SoC, and control a navigation function and additional function of the vehicle navigation device 2120. The memory 2122 includes RAM and ROM, and stores a program that is executed by the processor 2121, and data.

The GPS module 2124 measures a position (such as latitude, longitude, and altitude) of the car navigation device 2120 by using GPS signals received from a GPS satellite.

The sensor 2125 may include a group of sensors such as a gyroscope sensor, a geomagnetic sensor and an air pressure sensor. The data interface 2126 is connected to, for example, an in-vehicle network 2141 via a terminal that is not shown, and acquires data generated by the vehicle (such as vehicle speed data).

The content player 2127 reproduces content stored in a storage medium (such as a CD and a DVD) inserted into the storage medium interface 2128. The input apparatus 2129 includes, for example, a touch sensor configured to detect touch on a screen of the display apparatus 2130, a button, or a switch, and receives an operation or information inputted by a user. The display apparatus 2130 includes a screen such as a LCD or an OLED display, and displays an image of the navigation function or content that is reproduced. The speaker 2131 outputs sounds of the navigation function or the content that is reproduced.

The wireless communication interface 2133 supports any cellular communication scheme (such as LTE and LTE-advanced) and performs wireless communication. The wireless communication interface 2133 may typically include, for example, a BB processor 2134 and an RF circuit 2135. The BB processor 2134 may perform, for example, encoding/decoding, modulating/demodulating, and multiplexing/demultiplexing, and performs various types of signal processing for wireless communication. Meanwhile, the RF circuit 2135 may include for example a mixer, a filter and an amplifier, and transmit and receive a wireless signal via the antenna 2137. The wireless communication interface 2133 may be a chip module having the BB processor 2134 and the RF circuit 2135 integrated thereon. The wireless communication interface 2133 may include multiple BB processors 2134 and multiple RF circuits 2135, as shown in FIG. 16. Although FIG. 16 shows an example in which the wireless communication interface 2133 includes multiple BB processors 2134 and multiple RF circuits 2135, the wireless communication interface 2133 may also include a single BB processor 2134 and a single RF circuit 2135.

Furthermore, in addition to a cellular communication scheme, the wireless communication interface 2133 may support another type of wireless communication scheme such as a short-distance wireless communication scheme, a near field communication scheme, and a wireless LAN scheme. In this case, the wireless communication interface 2133 may include a BB processor 2134 and an RF circuit 2135 for each wireless communication scheme.

Each of the antenna switches 2136 switches connection destinations of the antennas 2137 among multiple circuits (such as circuits for different wireless communication schemes) included in the wireless communication interface 2133.

Each of the antennas 2137 includes one or more antenna elements (such as multiple antenna elements included in a MIMO antenna) and is used by the wireless communication interface 2133 to transmit and receive a wireless signal. As shown in FIG. 16, the car navigation device 2120 may include multiple antennas 2137. Although FIG. 16 illustrates an example in which the vehicle navigation device 2120 includes multiple antennas 2137, the car navigation device 2120 may also include a single antenna 2137.

In addition, the car navigation device 2120 may include an antenna 2137 for each wireless communication scheme. In this case, the antenna switches 2136 may be omitted from the configuration of the car navigation device 2120.

The battery 2138 supplies power to the blocks of the car navigation device 2120 shown in FIG. 16 via a feeder line, which is partially shown with a dash line in the figure. The battery 2138 accumulates power provided by the vehicle.

In the car navigation device 2120 shown in FIG. 16, the transceiver units 410 and 810 in the electronic devices 400 and 800 previously described with reference to FIGS. 4 and 8 may be implemented through the wireless communication interface 2133 and optional antenna 2137. The functions of the determination unit 420 and the generation unit 430 of the electronic device 400, and the generation unit 820 of the electronic device 800, may be implemented by the processor 2121. For example, the processor 2121 may achieve the functions of the determination unit 420 and the generation unit 430 by executing instructions stored in the memory 2122. Similarly, the processor 2121 may achieve the function of the generation unit 820 by executing instructions stored in the memory 2122.

The technology of the present disclosure may also be implemented as an in-vehicle system (or a vehicle) 2140 including one or more of the automobile navigation device 2120, a vehicle network 2141 and a vehicle module 2142. The vehicle module 2142 generates vehicle data (such as vehicle speed, engine speed, and trouble information), and outputs the generated data to the in-vehicle network 2141.

Preferred embodiments of the disclosure have been described above with reference to the drawings, but the disclosure is not limited to the above examples of course. Those skilled in the art may make various alternations and modifications within the scope of the appended claims. It should be understood that these alternations and modifications shall naturally fall within the technical scope of the present disclosure.

For example, units shown by a dotted line block in the functional block diagram shown in the drawings indicate that the functional units are optional in the corresponding apparatus, and the optional functional units may be combined appropriately to achieve required functions.

For example, multiple functions implemented by one unit in the above embodiments may be implemented by separate apparatus. Alternatively, multiple functions implemented by multiple units in the above embodiments may be implemented by separate apparatus, respectively. Furthermore, one of the above functions may be implemented by multiple units. Such configurations are naturally included in the technical scope of the present disclosure.

In the specification, steps described in the flow diagram include not only the processes performed chronologically as the described sequence, but also the processes performed in parallel or individually rather than chronologically. Furthermore, the steps performed chronologically may be performed in another sequence appropriately.

Embodiments of the present disclosure are described in detail in conjunction with the drawings. However, it should be understood that the embodiments described above are intended to illustrate the present disclosure rather than limit the present disclosure. Those skilled in the art may make various modifications and alternations to the above embodiments without departing from the spirit and scope of the present disclosure. Therefore, the scope of the present disclosure is defined by the appended claims and equivalents thereof.

The invention claimed is:

1. An electronic device, comprising:
processing circuitry configured to:
    receive first data and control information for the first data through a side link, wherein the control information for the first data comprises indication information for the first data for indicating the selection, for use, of a periodic feedback resource;
    receive second data and control information for the second data through the side link, wherein the control information for the second data comprises indication information for the second data for indicating the selection, for use, of the periodic feedback resource;
    determine a feedback resource for the first data based on the control information for the first data; and
    transmit feedback information for the first data using the determined feedback resource, wherein
the indication information for the second data and the indication information for the first data indicate to select and use feedback resources in a same period,
at least one of the first data and at least one of the second data are carried on different physical side link shared channels (PSSCHs) separately, and
the processing circuitry is further configured to:
    determine whether transmitting feedback information for each of the at least one of the first data and the at least one of the second data using a determined feedback resource exceeds a transmission ability of the electronic device, and
    when it is determined that the transmission ability of the electronic device is exceeded,
        preferentially transmit the feedback information for the one of the at least one of the first data and the at least one of the second data carried by the one of the PSSCHs with high priority using the determined feedback resource, and/or
        redetermine the feedback resources with a same frequency domain resource for multiple data of the at least one of the first data and the at least one of the second data received from a same user equipment and transmit the feedback information for the multiple data received from the same user equipment using the redetermined feedback resources.

2. The electronic device according to claim 1, wherein the indication information for the first data indicates a number of periods of feedback resources by which a feedback resource selected for use is spaced from a first available feedback resource.

3. The electronic device according to claim 1, wherein the control information for each of the first data and the second data further comprises an ID of a user equipment transmitting the respective one of the first data and the second data, and
the processing circuitry is further configured to determine a frequency domain resource of the feedback resource for each of the first data and the second data based on the ID of the user equipment transmitting the respective one of the first data and the second data and an ID of the electronic device.

4. The electronic device according to claim 3, wherein the first data, the second data, the control information for the first data, and the control information for the second data are received from the same user equipment, and
the processing circuitry is further configured to determine the feedback resource for the first data and a feedback resource for the second data with the same frequency domain resource.

5. The electronic device according to claim 4, wherein the first data and the second data are carried on different PSSCHs separately.

6. The electronic device according to claim 1, wherein
the first data and the control information for the first data
    are received from a first user equipment,
the second data and the control information for the second
    data are received from a second user equipment, and
the processing circuitry is further configured to determine
    the feedback resource for the first data and a feedback
    resource for the second data with different frequency
    domain resources.

7. The electronic device according to claim 1, wherein
the processing circuitry is further configured to obtain
    configuration information for the periodic feedback
    resource in advance, and
the configuration information specifies one or more can-
    didate periods for the periodic feedback resource.

8. The electronic device according to claim 7, wherein
the processing circuitry is further configured to obtain
    multiple sets of configuration information in advance,
    and
each set of configuration information is associated with a
    corresponding data service and specifies one or more
    candidate periods.

9. An electronic device, comprising:
processing circuitry, configured to:
transmit first data and control information for the first data
    to a user equipment through a side link, wherein the
    control information for the first data comprises indica-
    tion information for the first data for indicating the
    selection, for use, of a periodic feedback resource, and
    is used by the user equipment to determine a feedback
    resource;
transmit second data and control information for the
    second data to the user equipment through the side link,
    wherein the control information for the second data
    comprises indication information for the second data
    for indicating the selection, for use, of the periodic
    feedback resource; and
receive from the user equipment feedback information for
    the first data transmitted using the determined feedback
    resource, wherein
the indication information for the second data and the
    indication information for the first data indicate to
    select and use feedback resources in a same period,
at least one of the first data and at least one of the second
    data are carried on different physical side link shared
    channels (PSSCHs) separately, and
the processing circuitry is further configured to:
    preferentially receive feedback information for one of
        the at least one of the first data and the at least one
        of the second data carried by one of the PSSCHs with
        high priority using a determined feedback resource
        when a transmission ability of the user equipment is
        exceeded as determined for the feedback information
        of each of the at least one of the first data and the at
        least one of the second data, and/or
    receive feedback information for multiple data of the at
        least one of the first data and the at least one of the
        second data transmitted to the same user equipment
        using redetermined feedback resources with a same
        frequency domain resource for the multiple data
        when the transmission ability of the user equipment
        is exceeded as determined for the feedback informa-
        tion of each of the at least one of the first data and the
        at least one of the second data.

10. The electronic device according to claim 9, wherein
the indication information for the first data indicates a number of periods of feedback resources by which a feed-
back resource selected for use is spaced from a first available
feedback resource.

11. The electronic device according to claim 9, wherein
the control information for each of the first data and the
second data further comprises an ID of the electronic device,
for the user equipment to determine a frequency domain
resource of the feedback resource for each of the first data
and the second data based on an ID of the user equipment
and the ID of the electronic device.

12. The electronic device according to claim 11, wherein
the processing circuitry is further configured to receive from
the user equipment the feedback information for the first
data and feedback information for the second data transmit-
ted using feedback resources with the same frequency
domain resource.

13. The electronic device according to claim 12, wherein
the first data and the second data are carried on different
PSSCHs separately.

14. The electronic device according to claim 9, wherein
the processing circuitry is further configured to obtain
    configuration information for the periodic feedback
    resource in advance, and
the configuration information specifies one or more can-
    didate periods for the periodic feedback resource.

15. The electronic device according to claim 14, wherein
the processing circuitry is further configured to obtain
    multiple sets of configuration information in advance,
    and
each set of configuration information is associated with a
    corresponding data service and specifies one or more
    candidate periods.

16. A method for wireless communications, comprising:
receiving first data and control information for the first
    data through a side link, wherein the control informa-
    tion for the first data comprises indication information
    for the first data for indicating the selection, for use, of
    a periodic feedback resource;
receiving second data and control information for the
    second data through the side link, wherein the control
    information for the second data comprises indication
    information for the second data for indicating the
    selection, for use, of the periodic feedback resource;
determining a feedback resource for the first data based on
    the control information for the first data; and
transmitting feedback information for the first data using
    the determined feedback resource,
the indication information for the second data and the
    indication information for the first data indicate to
    select and use feedback resources in a same period,
at least one of the first data and at least one of the second
    data are carried on different physical side link shared
    channels (PSSCHs) separately, and
the method further comprises:
    determining whether transmitting feedback informa-
        tion for each of the at least one of the first data and
        the at least one of the second data using a determined
        feedback resource exceeds a transmission ability,
        and
    when it is determined that the transmission ability is
        exceeded,
        preferentially transmitting the feedback information
            for the one of the at least one of the first data and
            the at least one of the second data carried by the
            one of the PSSCHs with high priority using the
            determined feedback resource, and/or

redetermining the feedback resources with a same frequency domain resource for multiple data of the at least one of the first data and the at least one of the second data received from a same user equipment and transmit the feedback information for the multiple data received from the same user equipment using the redetermined feedback resources.

17. The method according to claim 16, wherein the indication information for the first data indicates a number of periods of feedback resources by which a feedback resource selected for use is spaced from a first available feedback resource.

\* \* \* \* \*

38